(12) United States Patent
Hatakeyama et al.

(10) Patent No.: US 11,078,317 B2
(45) Date of Patent: Aug. 3, 2021

(54) STRETCHABLE FILM AND METHOD FOR FORMING THE SAME

(71) Applicant: SHIN-ETSU CHEMICAL CO., LTD., Tokyo (JP)

(72) Inventors: Jun Hatakeyama, Joetsu (JP); Motoaki Iwabuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 388 days.

(21) Appl. No.: 16/255,137

(22) Filed: Jan. 23, 2019

(65) Prior Publication Data

US 2019/0233645 A1    Aug. 1, 2019

(30) Foreign Application Priority Data

Jan. 31, 2018 (JP) .............................. JP2018-014409

(51) Int. Cl.
*C08F 290/06* (2006.01)
*C08L 83/10* (2006.01)
(Continued)

(52) U.S. Cl.
CPC ...... *C08F 290/067* (2013.01); *C08G 18/0852* (2013.01); *C08G 18/12* (2013.01);
(Continued)

(58) Field of Classification Search
CPC ....... B32B 27/00; B32B 27/06; B32B 27/283; B32B 27/40; C08F 290/067; C08F 290/068; C08F 290/08; C08F 290/14; C08F 290/147; C08F 290/148; C08G 18/0838; C08G 18/0842; C08G 18/0847; C08G 18/0852; C08G 18/0857; C08G 18/0861; C08G 18/0866; C08G 18/0871;
(Continued)

(56) References Cited

U.S. PATENT DOCUMENTS

2017/0335076 A1 * 11/2017 Hatakeyama ............ H01B 5/16
2018/0215876 A1 * 8/2018 Hatakeyama ...... C08G 18/3206

FOREIGN PATENT DOCUMENTS

JP   H09-316085 A    12/1997
JP   H09316085 A  *  12/1997
(Continued)

OTHER PUBLICATIONS

JPH09316085A English Machine Translation, prepared Apr. 8, 2021. (Year: 2021).*

(Continued)

Primary Examiner — Christopher M Rodd
(74) Attorney, Agent, or Firm — Oliff PLC

(57) ABSTRACT

The present invention is a stretchable film including: a silicone main-chain type urethane layer and a silicone-pendant type urethane layer, wherein the silicone main-chain type urethane layer has a structure shown by the following general formula (1)-1 and/or (1)-2 and is formed on the silicone-pendant type urethane layer, and the silicone-pendant type urethane layer has a structure shown by the following general formula (2)-1 and/or (2)-2. The present invention provides a stretchable film having excellent stretchability and strength, with the film surface having excellent water repellency, together with a method for forming the same.

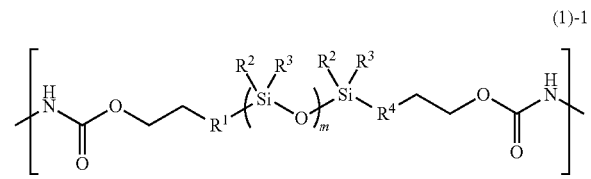

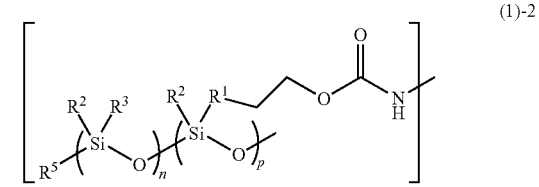

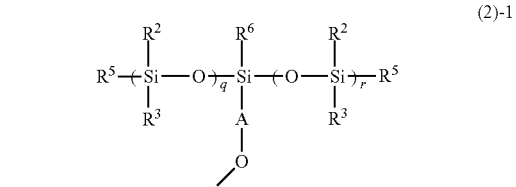

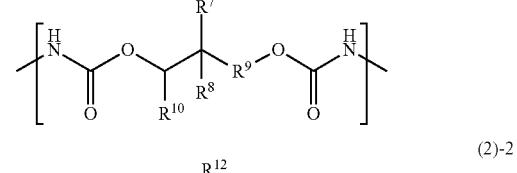

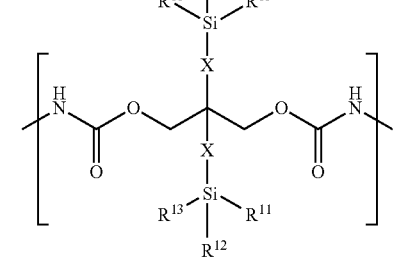

12 Claims, 2 Drawing Sheets

(51) Int. Cl.

| | | |
|---|---|---|
| *C08L 75/04* | (2006.01) | |
| *C08J 5/18* | (2006.01) | |
| *C08G 18/12* | (2006.01) | |
| *C08G 18/38* | (2006.01) | |
| *C08G 18/75* | (2006.01) | |
| *C08G 18/28* | (2006.01) | |
| *C08G 18/66* | (2006.01) | |
| *C08G 18/72* | (2006.01) | |
| *C08G 18/32* | (2006.01) | |
| *C08G 18/42* | (2006.01) | |
| *C08G 18/61* | (2006.01) | |
| *C08G 18/73* | (2006.01) | |
| *C08G 18/79* | (2006.01) | |
| *C08G 18/76* | (2006.01) | |
| *C08G 18/08* | (2006.01) | |
| *C08G 18/48* | (2006.01) | |
| *C08G 18/44* | (2006.01) | |
| *C08G 18/67* | (2006.01) | |
| *C08J 7/04* | (2020.01) | |
| *C08J 7/046* | (2020.01) | |

(52) U.S. Cl.
CPC ....... *C08G 18/289* (2013.01); *C08G 18/3203* (2013.01); *C08G 18/3212* (2013.01); *C08G 18/3893* (2013.01); *C08G 18/4238* (2013.01); *C08G 18/44* (2013.01); *C08G 18/4854* (2013.01); *C08G 18/61* (2013.01); *C08G 18/6674* (2013.01); *C08G 18/6677* (2013.01); *C08G 18/6705* (2013.01); *C08G 18/722* (2013.01); *C08G 18/73* (2013.01); *C08G 18/755* (2013.01); *C08G 18/758* (2013.01); *C08G 18/7614* (2013.01); *C08G 18/792* (2013.01); *C08J 5/18* (2013.01); *C08J 7/046* (2020.01); *C08J 7/0427* (2020.01); *C08L 75/04* (2013.01); *C08L 83/10* (2013.01); *C08J 2375/04* (2013.01); *C08J 2383/10* (2013.01); *C08J 2475/04* (2013.01); *C08J 2483/10* (2013.01); *C08L 2203/16* (2013.01); *C08L 2205/025* (2013.01)

(58) Field of Classification Search
CPC .... C08G 18/0876; C08G 18/10; C08G 18/12; C08G 18/289; C08G 18/3203; C08G 18/3206; C08G 18/3209; C08G 18/3212; C08G 18/3215; C08G 18/3218; C08G 18/3221; C08G 18/3893; C08G 18/4238; C08G 18/44; C08G 18/46; C08G 18/4692; C08G 18/4854; C08G 18/5096; C08G 18/588; C08G 18/61; C08G 18/615; C08G 18/6674; C08G 18/6677; C08G 18/6705; C08G 18/722; C08G 18/73; C08G 18/755; C08G 18/758; C08G 18/764; C08G 18/792; C08G 18/837; C08J 5/18; C08J 7/04; C08J 7/042; C08J 7/0423; C08J 7/0427; C08J 7/046; C08J 2383/00; C08J 2383/04; C08J 2383/05; C08J 2383/06; C08J 2383/07; C08J 2383/08; C08J 2383/10; C08J 2383/12; C08J 2383/14; C08J 2383/16; C08L 75/04; C08L 83/10; C08L 83/12; C08L 2203/16; C08L 2205/025; C09D 175/04; C09D 151/08; C09D 151/085

See application file for complete search history.

(56) References Cited

FOREIGN PATENT DOCUMENTS

| | | |
|---|---|---|
| JP | 2001-018329 A | 1/2001 |
| JP | 2004-033468 A | 2/2004 |
| JP | 2012-152725 A | 8/2012 |
| KR | 2017-0131248 A | 11/2017 |

OTHER PUBLICATIONS

Mar. 4, 2020 Korean Office Action issued in Korean Application No. 10-2019-0011452.

* cited by examiner

STRETCHABLE FILM AND METHOD FOR FORMING THE SAME

TECHNICAL FIELD

The present invention relates to a stretchable film that combines stretchability, strength, and water repellency, together with a method for forming the same.

BACKGROUND ART

A recent growing popularity of Internet of Things (IoT) has accelerated the development of such major wearable devices as watches and glasses that allow for Internet access. Even in the fields of medicine and sports, wearable devices for constantly monitoring the user's physical state are increasingly demanded, and such technological development is expected to be further encouraged.

One typical wearable device is attached to the human body of users to constantly monitor the state of physical conditions. The wearable device normally includes a bio-electrode for detecting an electric signal transmitted from a body, wires for sending the electric signal to a sensor, a semiconductor chip serving as a sensor, and a battery, as well as an adhesive pad to be attached to the skin. Patent Document 1 describes detailed structures of a bio-electrode, a wiring part surrounding the bio-electrode, and an adhesive pad. The wearable device disclosed in Patent Document 1 includes a bio-electrode, a silicone-based adhesive film disposed around the bio-electrode, a sensor device, and a meandering-shaped stretchable silver wiring part coated with a stretchable urethane film between the bio-electrode and the sensor device.

The urethane film has high stretchability and strength, and excellent mechanical properties as a film coated on a stretchable wiring part. Unfortunately, the hydrolysis inherent in the urethane film lowers its stretchability and strength, while the silicone film has no such hydrolysis, but the strength inherently remains low.

The use of silicone urethane polymers, whose main chain has both a urethane bond and a siloxane bond, has been examined. Advantageously, cured products of the silicone urethane polymer are characterized by higher strength than single silicone and lower hydrolysis than single polyurethane. Such cured products unfortunately fail to achieve the strength equivalent to single polyurethane and the water repellency equivalent to single silicone, and the strength and water repellency are in-betweens of those inherent in silicone and polyurethane.

Highly stretchable urethane films tend to have a sticky surface to the touch. The sticky surface causes difficulty in separating films that are put together and failure in printing since the film is stuck to a printing plate when screen printing is performed on this film. On the other hand, silicone films have high release characteristics and are prevented from sticking with each other thereby. However, due to the lower strength of silicone, thin silicone films easily break in stretching. When screen printing is performed on a silicone film, failure in printing due to sticking with a printing plate can be avoided, but the lower adhesion to ink causes peeling off of the cured ink. This comes from high release characteristics of a silicone surface. On the other hand, urethane films have higher adhesion to ink and are prevented from peeling off of the cured ink.

Films using polyurethane with a silicone pendant have well balanced stretchability, strength, and water repellency, but have drawbacks of mutual sticking of the films or sticking to a printing plate in screen printing due to sticking of the film surface. In a film based on polyurethane having a main chain of a silicone block copolymer, the film surface is free from sticking, but the strength is poor.

Accordingly, it is desirable to develop a stretchable film having higher stretchability and strength without causing sticking of the surface, on which printing such as screen printing can be performed without peeling off of the printed ink.

A skin sheet material for a bicycle is proposed, having a surface coated with a silicone-urethane film, a urethane film on the inside, and a polyolefin elastomer interior (Patent Document 2). With the silicone-urethane film at the outermost surface, the wear resistance is improved. Having lower surface energy, silicone is free from sticking, which improves the wear resistance.

CITATION LIST

Patent Literature

Patent Document 1: Japanese Patent Laid-Open Publication No. 2004-033468

Patent Document 2: Japanese Patent Laid-Open Publication No. 2001-18329

SUMMARY OF THE INVENTION

Technical Problem

Due to these backgrounds, it has been demanded to develop a self-standing stretchable film having excellent stretchability and strength that are equivalent to polyurethane as well as excellent water repellency that is equivalent to silicone without causing mutual sticking of the films, and a method for forming the same.

The present invention was made in view of the circumstances, and has an object to provide a stretchable film that is excellent in stretchability, strength, and water repellency on the film surface, and a method for forming the stretchable same.

Solution to Problem

To solve the problems, the present invention provides a stretchable film comprising:

a silicone main-chain type urethane layer and a silicone-pendant type urethane layer, wherein the silicone main-chain type urethane layer has a structure shown by the following general formula (1)-1 and/or (1)-2 and is formed on the silicone-pendant type urethane layer, and the silicone-pendant type urethane layer has a structure shown by the following general formula (2)-1 and/or (2)-2:

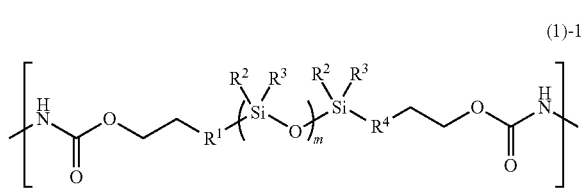

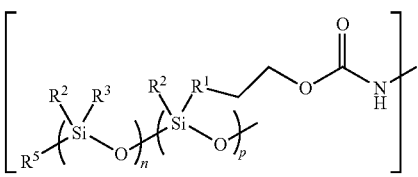
(1)-2

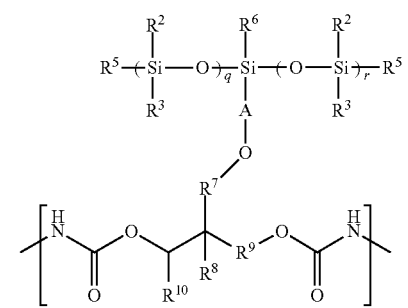
(2)-1

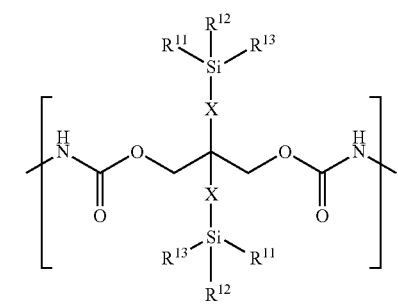
(2)-2 wherein $R^1$ and $R^4$ each represent a linear or branched alkylene group having 1 to 40 carbon atoms optionally containing an ether group or a thiol group; $R^2$, $R^3$, and $R^5$ represent the same or different linear, branched, or cyclic alkyl group having 1 to 6 carbon atoms, a phenyl group, or a 3,3,3-trifluoropropyl group; $R^6$, $R^{11}$, $R^{12}$, and $R^{13}$ represent the same or different linear, branched, or cyclic alkyl group having 1 to 6 carbon atoms, a phenyl group, a 3,3,3-trifluoropropyl group, or a —(OSiR²R³)$_s$—OSiR²R³R⁵ group; $R^7$ and $R^9$ each represent a single bond, a methylene group, or an ethylene group, provided that the total number of the carbon atoms of $R^7$ and $R^9$ is 1 or 2; $R^8$ represents a hydrogen atom or a linear alkyl group having 1 to 4 carbon atoms; $R^{10}$ represents a hydrogen atom or a methyl group; "A" represents a linear or branched alkylene group having 3 to 7 carbon atoms; X represents a linear or branched alkylene group having 3 to 7 carbon atoms optionally containing an ether group; "m" and "n" are each an integer in the range of 1 to 100; "p" is an integer in the range of 2 to 10; and "q", "r", and "s" are each an integer in the range of 0 to 20.

The inventive stretchable film is excellent in stretchability, strength, and water repellency on the film surface.

The silicone main-chain type urethane layer preferably has a structure containing a (meth)acrylate group at a terminal thereof shown by the following general formula (3)-1 and/or (3)-2:

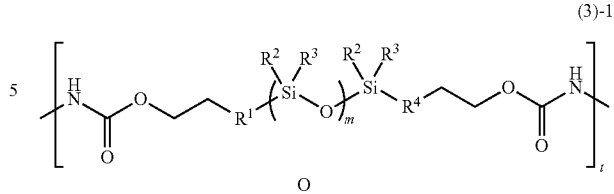
(3)-1

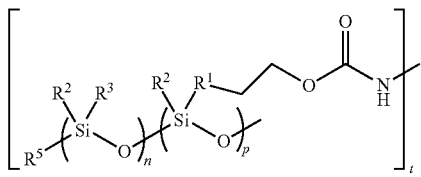
(3)-2

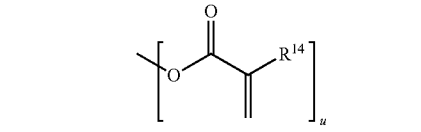

wherein $R^1$ to $R^5$, "m", "n", and "p" are the same as described above; $R^{14}$ represents a hydrogen atom or a methyl group; "t" and "u" each represent a number of unit in one molecule, and are integers in the range of 1≤t≤100 and 1≤u≤3.

The silicone-pendant type urethane layer preferably has a structure containing a (meth)acrylate group at a terminal thereof shown by the following general formula (4)-1 and/or (4)-2:

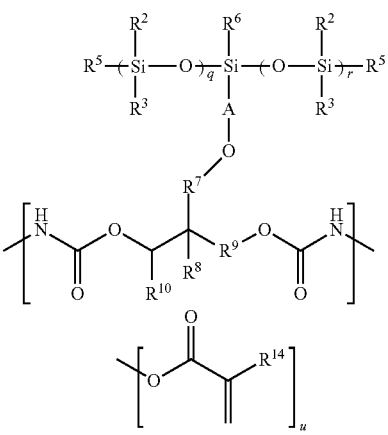
(4)-1

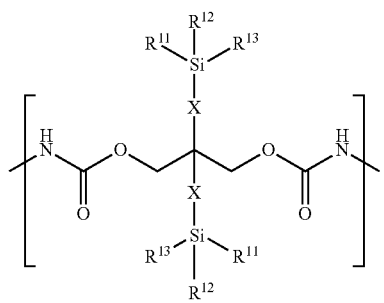
(4)-2

-continued

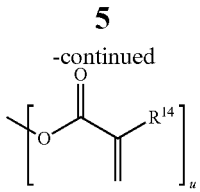

wherein $R^2$, $R^3$, $R^5$ to $R^{13}$, "A", X, "q", and "r" are the same as described above; $R^{14}$ represents a hydrogen atom or a methyl group; "t" and "u" each represent a number of unit in one molecule, and are integers in the range of $1 \leq t \leq 100$ and $1 \leq u \leq 3$.

With a structure having a (meth)acrylate group at the terminal, the stretchable film becomes particularly excellent in stretchability, strength, and water repellency on the film surface.

It is preferable that the stretchable film have a stretching property of 20 to 800% in a tensile test regulated by JIS K 6251.

With such a stretching property, the stretchable film can be particularly preferably used as a coating film of a stretchable wiring.

The stretchable film is preferably used as a film to be in contact with a conductive wiring having stretchability.

The inventive stretchable film is particularly suitable for such a use.

The present invention also provides a method for forming a stretchable film comprising:

forming a silicone-pendant type urethane layer having a structure shown by the following general formula (2)-1 and/or (2)-2 through curing by heating and/or light exposure; and forming a silicone main-chain type urethane layer having a structure shown by the following general formula (1)-1 and/or (1)-2 on a surface of the silicone-pendant type urethane layer through curing by heating and/or light exposure:

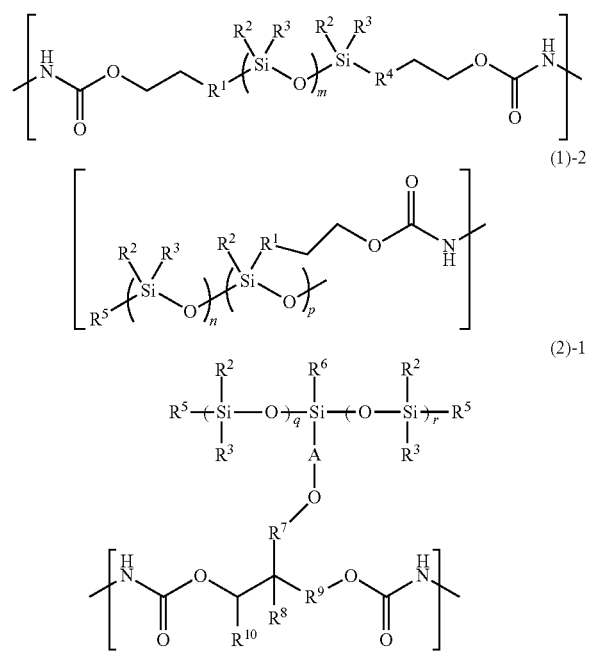

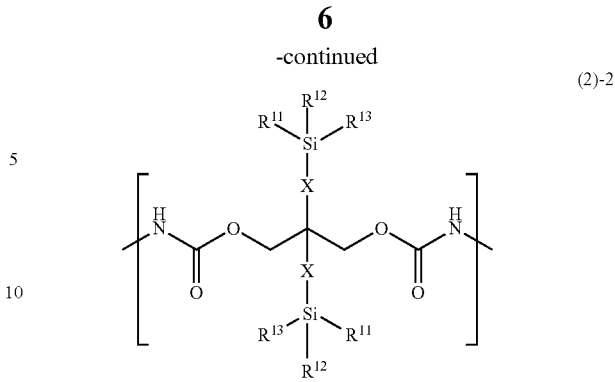

wherein $R^1$ and $R^4$ each represent a linear or branched alkylene group having 1 to 40 carbon atoms optionally containing an ether group or a thiol group; $R^2$, $R^3$, and $R^5$ represent the same or different linear, branched, or cyclic alkyl group having 1 to 6 carbon atoms, a phenyl group, or a 3,3,3-trifluoropropyl group; $R^6$, $R^{11}$, $R^{12}$, and $R^{13}$ represent the same or different linear, branched, or cyclic alkyl group having 1 to 6 carbon atoms, a phenyl group, a 3,3,3-trifluoropropyl group, or a $-(OSiR^2R^3)_s-$ $OSiR^2R^3R^5$ group; $R^7$ and $R^9$ each represent a single bond, a methylene group, or an ethylene group, provided that the total number of the carbon atoms of $R^7$ and $R^9$ is 1 or 2; $R^8$ represents a hydrogen atom or a linear alkyl group having 1 to 4 carbon atoms; $R^{10}$ represents a hydrogen atom or a methyl group; "A" represents a linear or branched alkylene group having 3 to 7 carbon atoms; X represents a linear or branched alkylene group having 3 to 7 carbon atoms optionally containing an ether group; "m" and "n" are each an integer in the range of 1 to 100; "p" is an integer in the range of 2 to 10; and "q", "r", and "s" are each an integer in the range of 0 to 20.

The inventive method for forming a stretchable film makes it possible to easily form a stretchable film that is excellent in stretchability, strength, and water repellency on the film surface.

Advantageous Effects of Invention

As described above, the stretchable film of the present invention has excellent stretchability and strength that are equivalent to polyurethane, and the film surface is excellent in water repellency and free from sticking equivalently to or superiorly to silicone having a main chain of a siloxane bond. The composite stretchable film of the present invention, in which a layer based on polyurethane having a main chain of silicone block copolymer is formed on a surface of a layer based on silicone-pendant polyurethane, is able to become a film having higher strength and is free from sticking on the surface. The inventive stretchable film like this is brought into contact with a conductive wiring or used for coating one side or the both sides of a conductive wiring to give a conductive stretchable film composite that is excellent in stretchability and strength, free from sticking on the surface, and excellent in texture and water repellency. Accordingly, the stretchable film of the present invention can be used particularly desirably as a stretchable film capable of mounting not only a wiring part for connecting a bio-electrode and a sensor but also all of such a bio-electrode and sensor in a wearable device. Moreover, the inventive method for forming a stretchable film makes it possible to form the above stretchable film easily.

DESCRIPTION OF EMBODIMENTS

Figure 1:
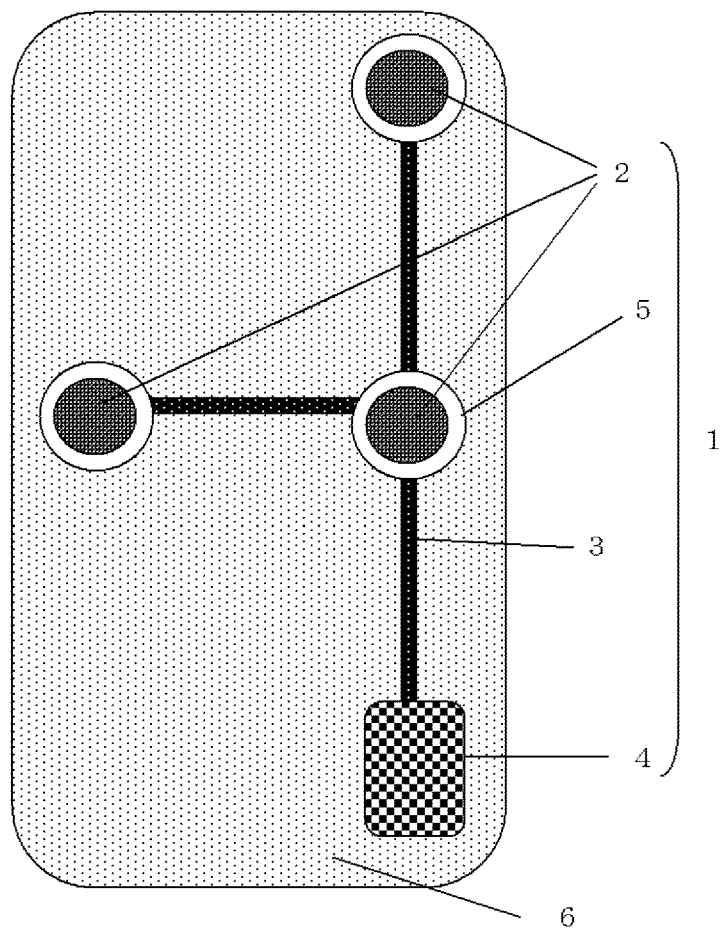
FIG. 1 is a schematic illustration of an electrocardiograph formed on a stretchable film of the present invention viewed from a bio-electrode side.

Polyurethane has sufficient stretchability and strength, but unfortunately the water repellency is low and the strength and stretchability are low due to hydrolysis. Also, another drawback is that silicone has higher water repellency, but lower strength. In a cured product of a silicone urethane polymer having the both of a urethane bond and a siloxane bond in the main chain, there is a drawback of lower strength though the surface has excellent water repellency and hardly has stickiness. A film based on urethane having a silicone-pendant side chain has a drawback of surface stickiness though it has higher strength, higher stretchability, and higher water repellency. Under the circumstances, it has been desired to develop a stretchable film having excellent stretchability and strength that are equivalent to polyurethane, with the film surface having sufficiently higher strength, together with having excellent water repellency and surface hardness that are equivalent to or more than those of silicone, and a method for forming the same.

Accordingly, the present inventors have diligently investigated to solve the foregoing subject. As a result, the inventors have found that an excellent stretchable film is obtained by forming a layer based on silicone urethane with the main chain having both of silicone and urethane on the surface of a layer based on silicone side-chain type urethane, which has higher stretchability, higher strength, and higher water repellency, but sticky surface, to make a composite film having higher stretchability, higher strength, and higher water repellency without surface stickiness so as not to stick the films with each other; and the film is particularly suitable as a stretchable substrate film to form a stretchable wiring in a wearable device; thereby completing the present invention.

That is, the present invention is a stretchable film comprising:
a silicone main-chain type urethane layer and a silicone-pendant type urethane layer,
wherein the silicone main-chain type urethane layer has a structure shown by the following general formula (1)-1 and/or (1)-2 and is formed on the silicone-pendant type urethane layer, which has a structure shown by the following general formula (2)-1 and/or (2)-2:

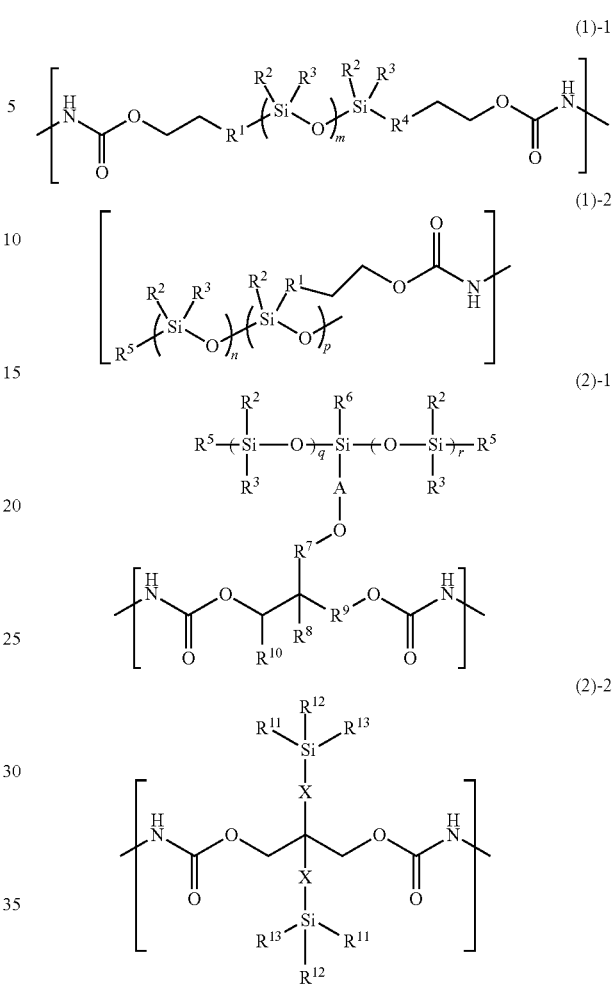

wherein $R^1$ and $R^4$ each represent a linear or branched alkylene group having 1 to 40 carbon atoms optionally containing an ether group or a thiol group; $R^2$, $R^3$, and $R^5$ represent the same or different linear, branched, or cyclic alkyl group having 1 to 6 carbon atoms, a phenyl group, or a 3,3,3-trifluoropropyl group; $R^6$, $R^{11}$, $R^{12}$, and $R^{13}$ represent the same or different linear, branched, or cyclic alkyl group having 1 to 6 carbon atoms, a phenyl group, a 3,3,3-trifluoropropyl group, or a —$(OSiR^2R^3)_s$—$OSiR^2R^3R^5$ group; $R^7$ and $R^9$ each represent a single bond, a methylene group, or an ethylene group, provided that the total number of the carbon atoms of $R^7$ and $R^9$ is 1 or 2; $R^8$ represents a hydrogen atom or a linear alkyl group having 1 to 4 carbon atoms; $R^{10}$ represents a hydrogen atom or a methyl group; "A" represents a linear or branched alkylene group having 3 to 7 carbon atoms; X represents a linear or branched alkylene group having 3 to 7 carbon atoms optionally containing an ether group; "m" and "n" are each an integer in the range of 1 to 100; "p" is an integer in the range of 2 to 10; and "q", "r", and "s" are each an integer in the range of 0 to 20.

Hereinafter, the present invention will be specifically described, but the present invention is not limited thereto.
<Stretchable Film>
[Silicone Main-Chain Type Urethane Layer]
The silicone main-chain type urethane layer formed at the surface of the inventive stretchable film has a structure shown by the general formula (1)-1 and/or (1)-2:

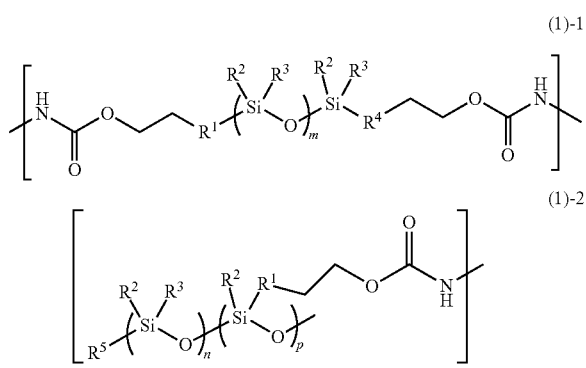

(1)-1

(1)-2 wherein $R^2$ and $R^4$ each represent a linear or branched alkylene group having 1 to 40 carbon atoms optionally containing an ether group or a thiol group; $R^2$, $R^3$, and $R^5$ represent the same or different linear, branched, or cyclic alkyl group having 1 to 6 carbon atoms, a phenyl group, or a 3,3,3-trifluoropropyl group; "m" and "n" are each an integer in the range of 1 to 100; and "p" is an integer in the range of 2 to 10.

Illustrative examples of $R^2$ and $R^4$ include a methylene group, an ethylene group, a propylene group, and a butylene group. Illustrative examples of $R^2$, $R^3$, and $R^5$ include a methyl group, an ethyl group, an isopropyl group, a 3,3,3-trifluoropropyl group, and a phenyl group.

In the silicone main-chain type urethane layer having a structure shown by the general formula (1)-1 and/or (1)-2, the terminal preferably has a structure containing a (meth)acrylate group shown by the general formula (3)-1 and/or (3)-2:

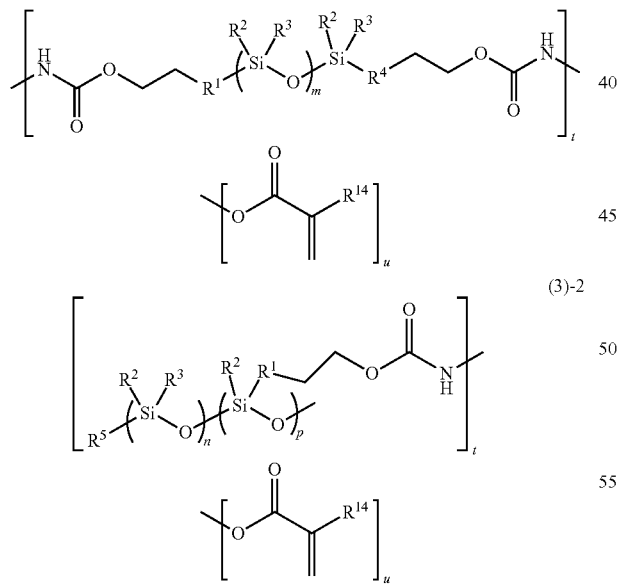

(3)-1

(3)-2 wherein $R^2$ to $R^5$, "m", "n", and "p" are the same as described above; $R^{14}$ represents a hydrogen atom or a methyl group; "t" and "u" each represent a number of unit in one molecule, and are integers in the range of 1 t 100 and 1≤u≤3.

As a silicone compound for forming the silicone main-chain type urethane layer having a structure of the general formula (1)-1 and/or (1)-2, the compounds shown by the following general formulae (1)-1' and (1)-2' can be exemplified:

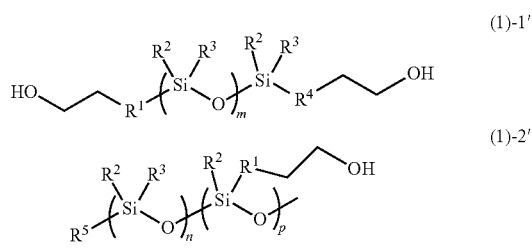

(1)-1'

(1)-2' wherein $R^1$ to $R^5$, "m", "n", and "p" are the same as described above.

[Silicone-Pendant Type Urethane Layer]

The silicone-pendant type urethane layer contained in the inventive stretchable film has a structure shown by the general formula (2)-1 and/or (2)-2:

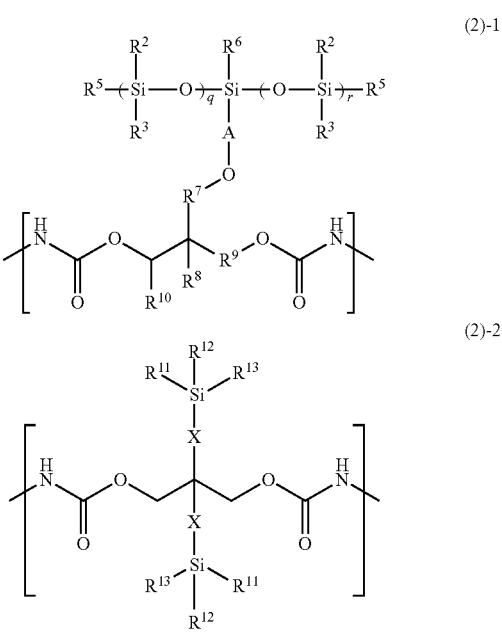

(2)-1

(2)-2 wherein $R^2$, $R^3$, and $R^5$ represent the same or different linear, branched, or cyclic alkyl group having 1 to 6 carbon atoms, a phenyl group, or a 3,3,3-trifluoropropyl group; $R^6$, $R^{11}$, $R^{12}$, and $R^{13}$ represent the same or different linear, branched, or cyclic alkyl group having 1 to 6 carbon atoms, a phenyl group, a 3,3,3-trifluoropropyl group, or a —$(OSiR^2R^3)_s$—$OSiR^2R^3R^5$ group; $R^7$ and $R^9$ each represent a single bond, a methylene group, or an ethylene group, provided that the total number of the carbon atoms of $R^7$ and $R^9$ is 1 or 2; $R^8$ represents a hydrogen atom or a linear alkyl group having 1 to 4 carbon atoms; $R^{10}$ represents a hydrogen atom or a methyl group; "A" represents a linear or branched alkylene group having 3 to 7 carbon atoms; X represents a linear or branched alkylene group having 3 to 7 carbon atoms optionally containing an ether group; and "q", "r", and "s" are each an integer in the range of 0 to 20.

In the silicone-pendant type urethane layer having a structure shown by the general formula (2)-1 and/or (2)-2, the terminal preferably has a structure containing a (meth)acrylate group shown by the general formula (4)-1 and/or (4)-2:

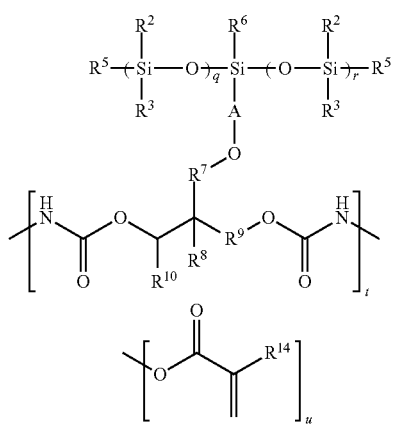

(4)-1

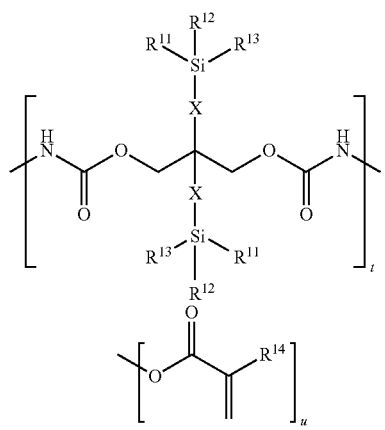

(4)-2 wherein $R^2$, $R^3$, $R^5$ to $R^{14}$, "A", X, "q", "t", and "u" are the same as described above.

As a diol compound for forming the structure shown by the following general formula (2)-1 in the silicone-pendant type urethane layer, the compounds shown by the following general formula (2)-1' can be exemplified:

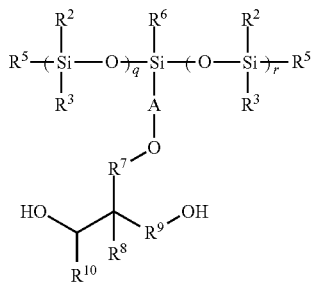

(2)-1' wherein $R^2$, $R^3$, $R^5$ to $R^{10}$, "A", "q", and "r" are the same as described above.

The diol compound having a pendant short-chain silicone shown by the general formula (2)-1' can be obtained by reaction of glycerin monoallyl ether and a short-chain siloxane compound having a SiH group under a platinum catalyst, for example. Illustrative examples thereof include the following.

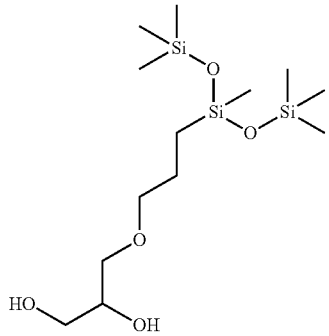

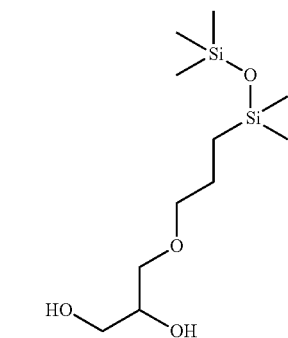

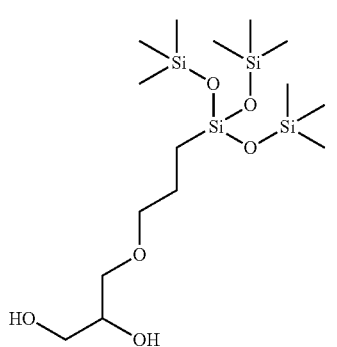

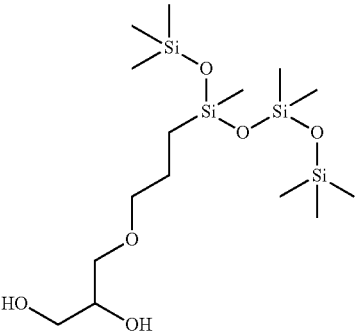

-continued
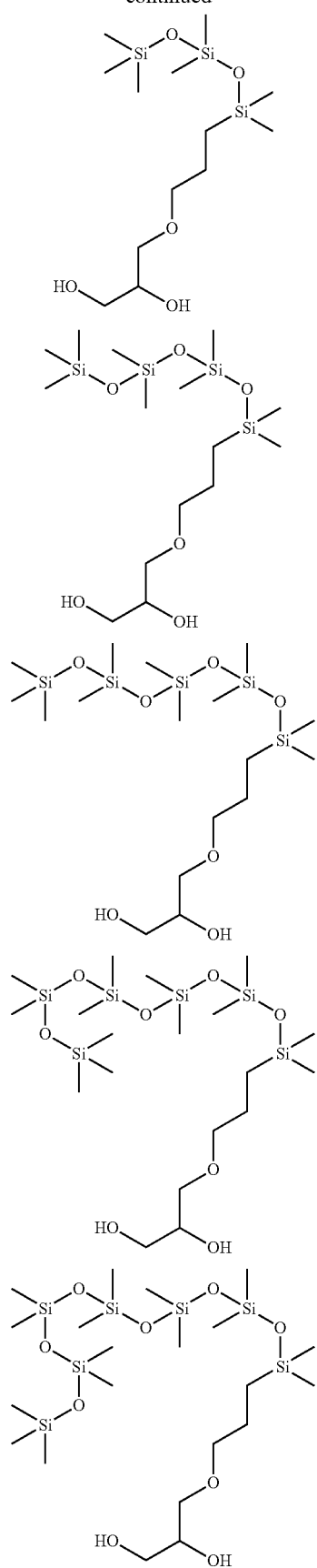
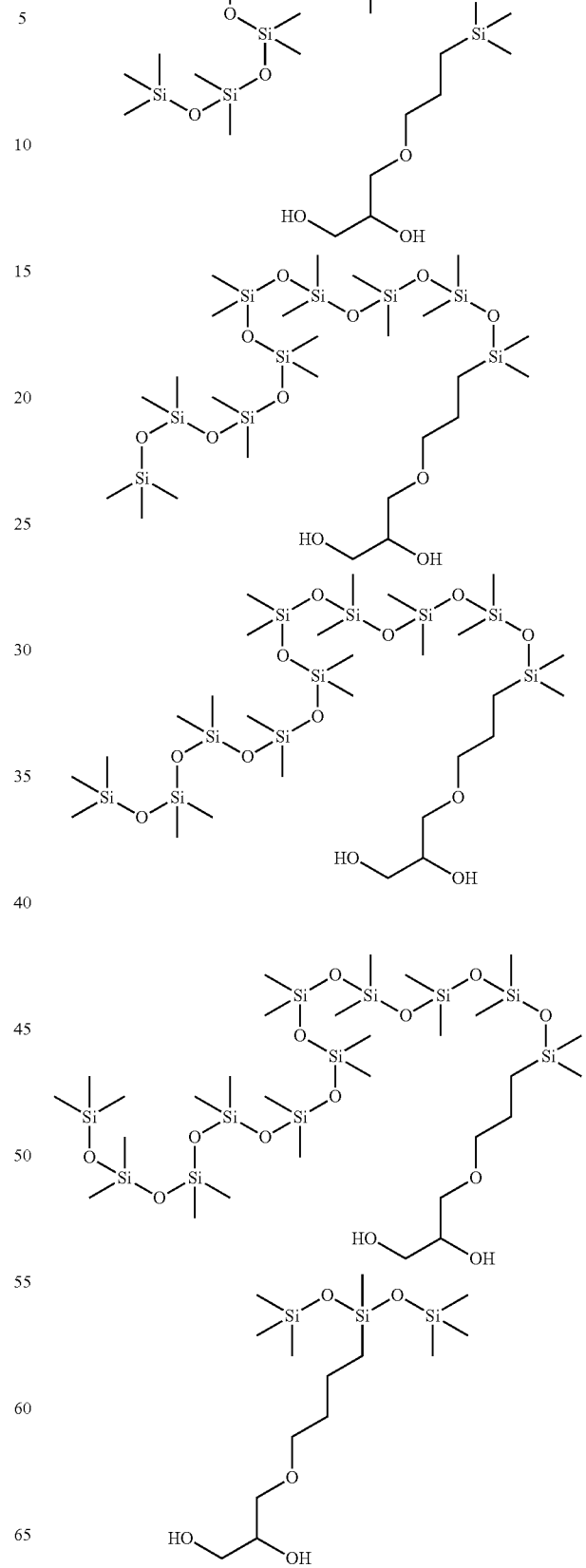

-continued
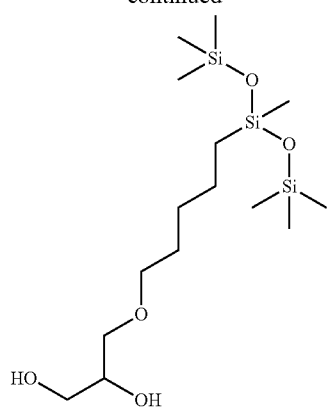
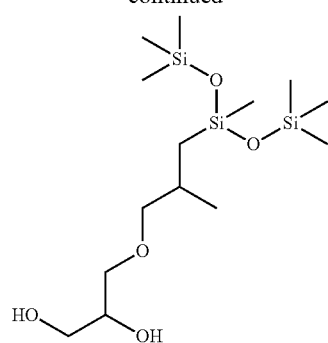
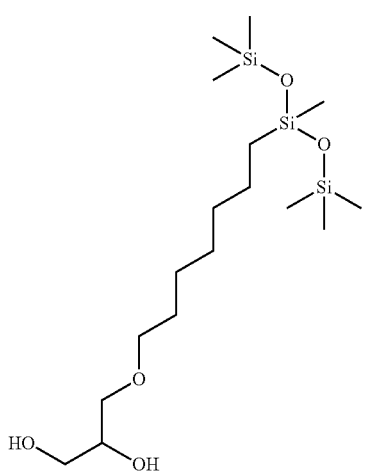
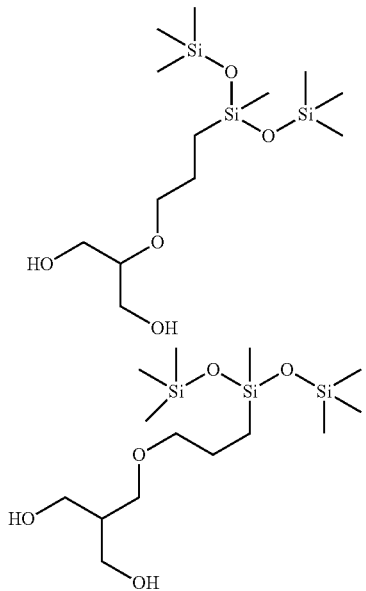

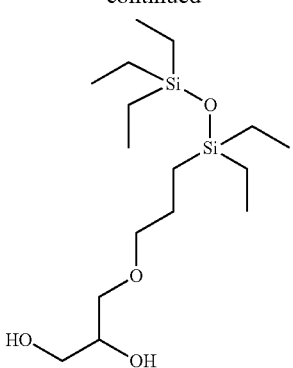
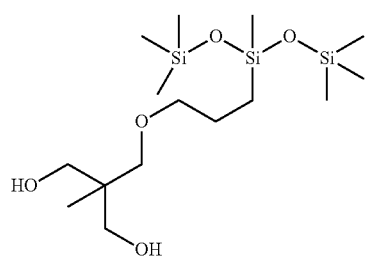
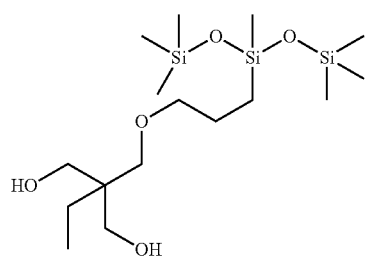
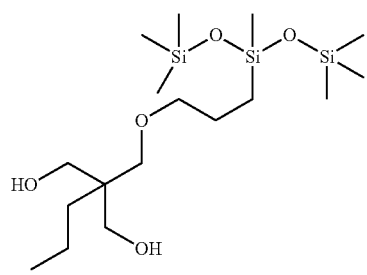
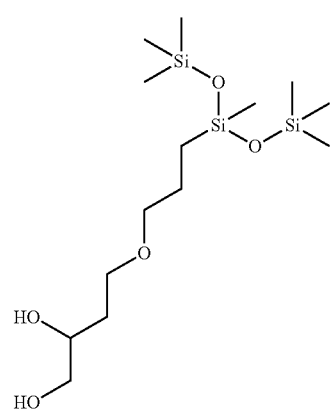

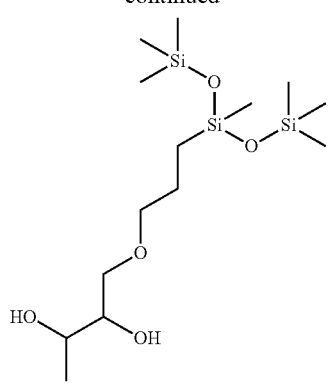

As a diol compound for forming the structure shown by the following general formula (2)-2 in the silicone-pendant type urethane layer, the compounds shown by the following general formula (2)-2' can be exemplified:

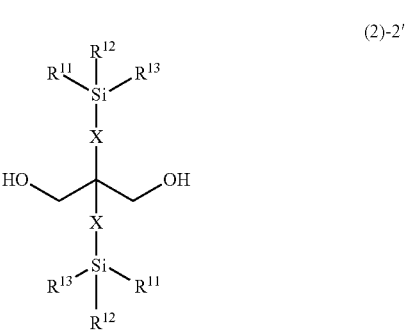

(2)-2' wherein $R^{11}$ to $R^{13}$ and X are the same as described above.

The diol compound having a pendant short-chain silicone shown by the general formula (2)-2' can be obtained by reaction of a dihydroxy dialkenyl compound and a short-chain siloxane compound having a SiH group under a platinum catalyst, for example. Illustrative examples thereof include the following.

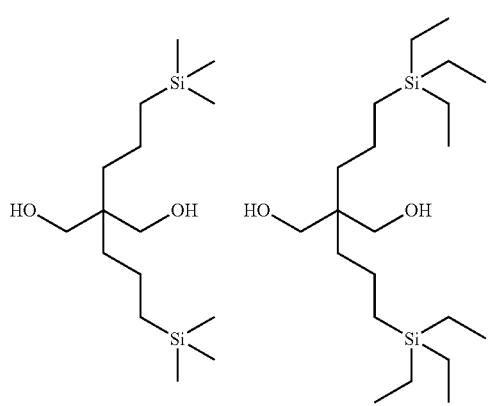

-continued
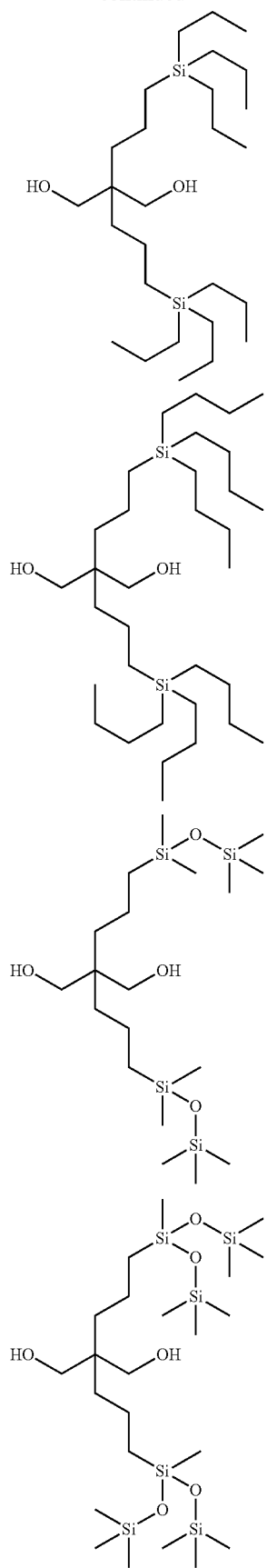
-continued
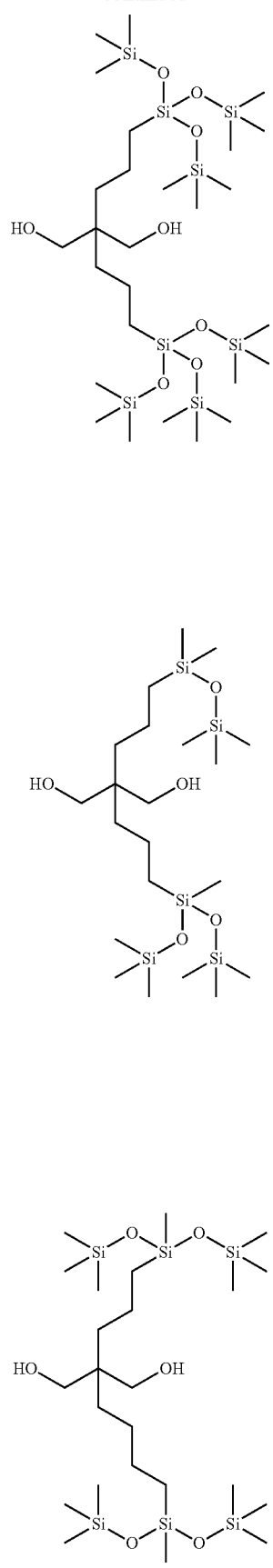

-continued
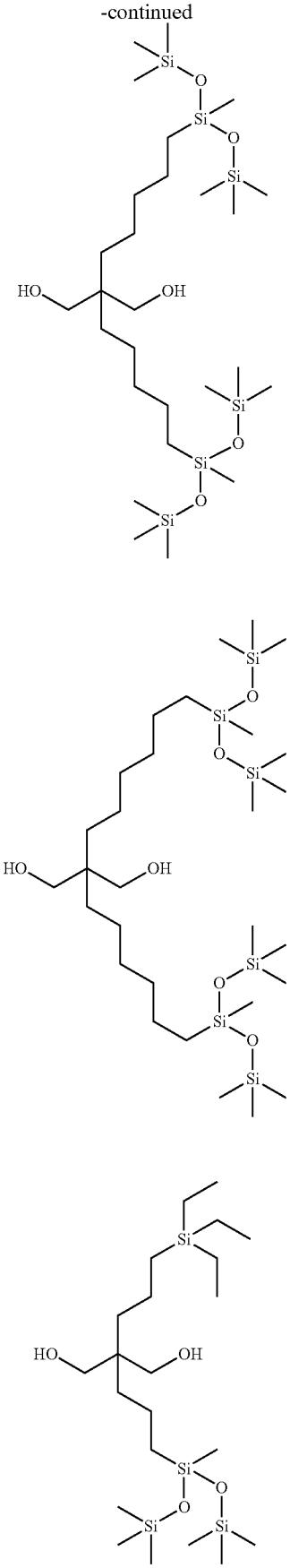
-continued
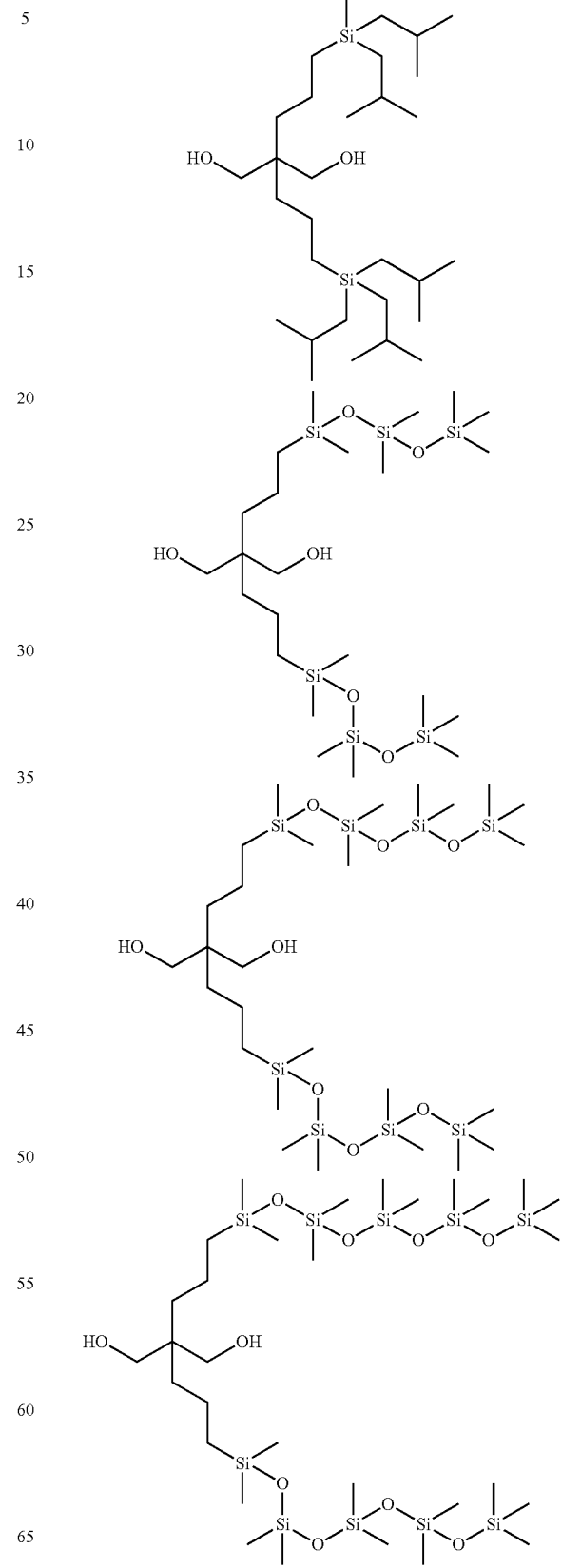

-continued
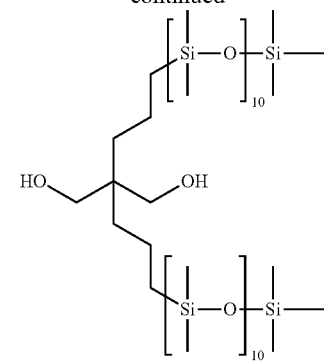
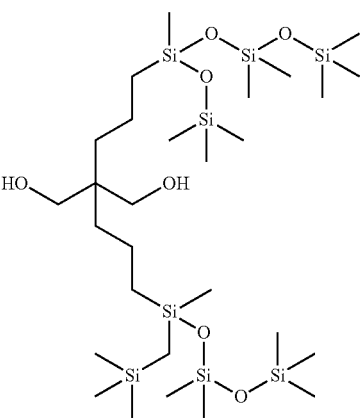
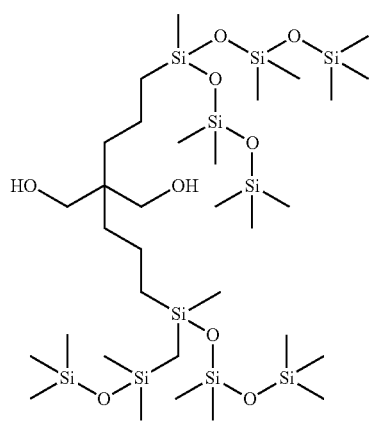
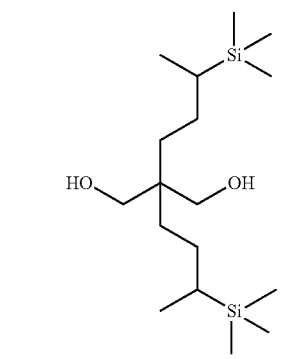
-continued
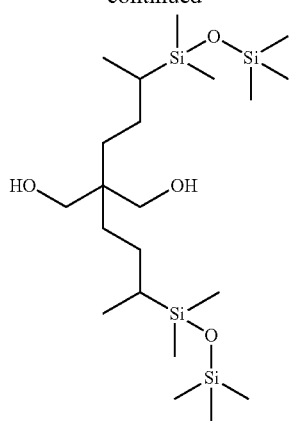
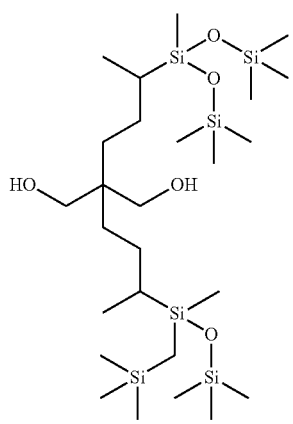
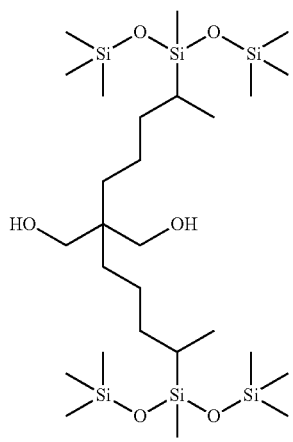

25
-continued
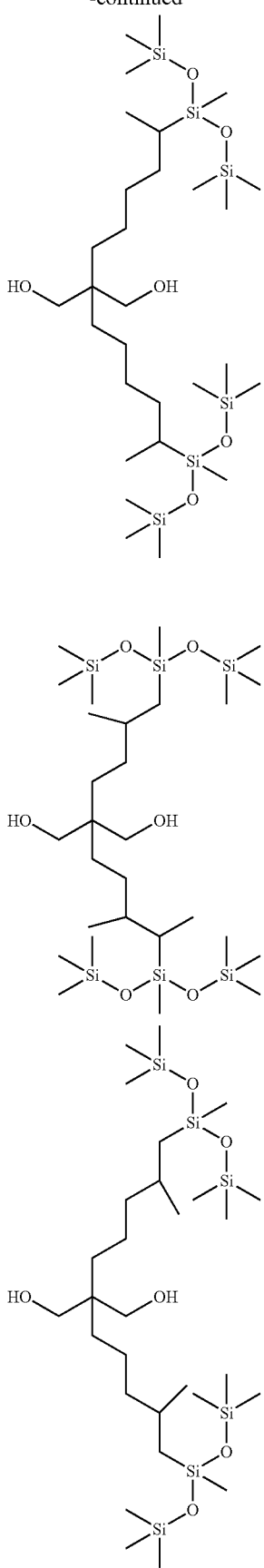
26
-continued
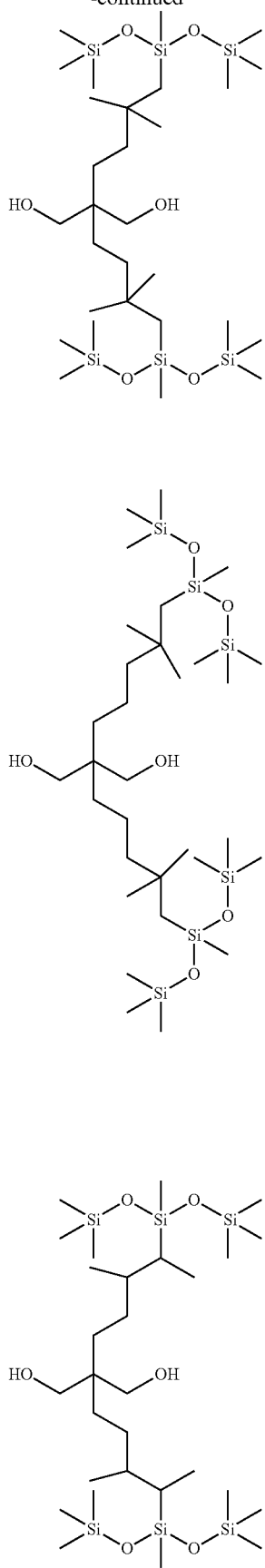

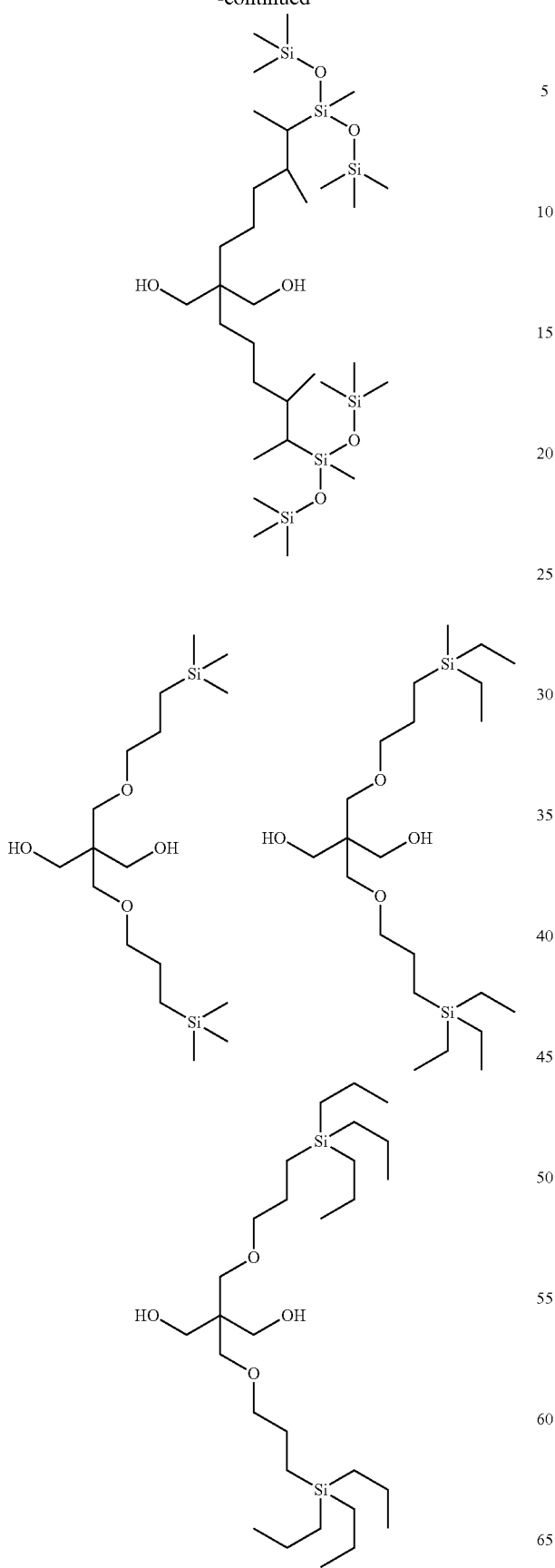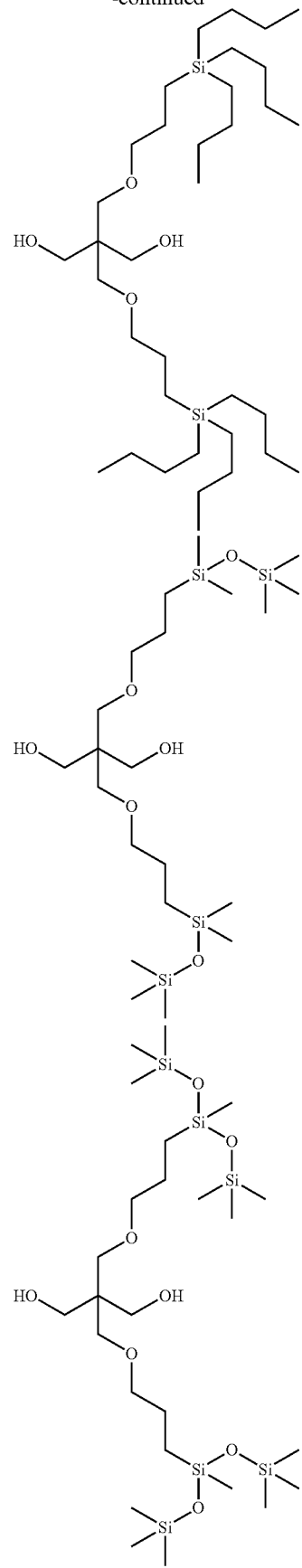

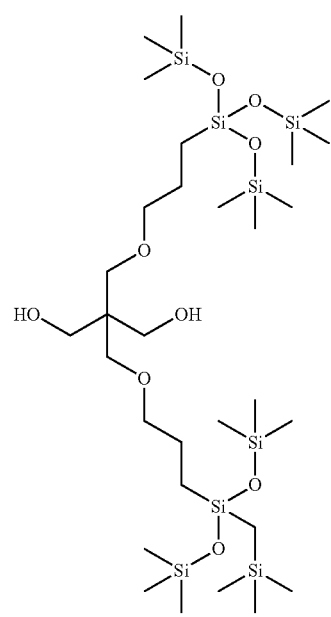
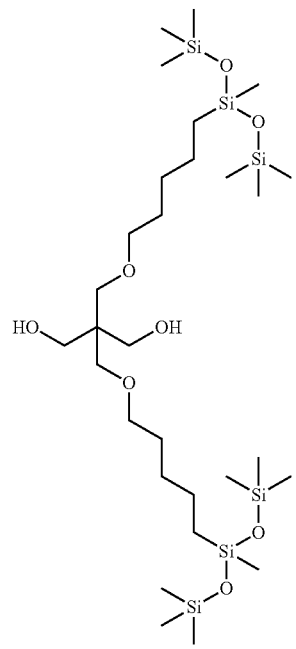
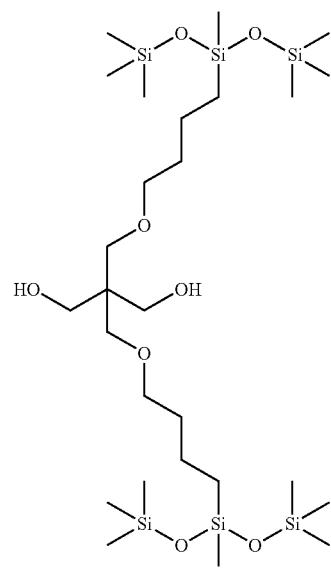
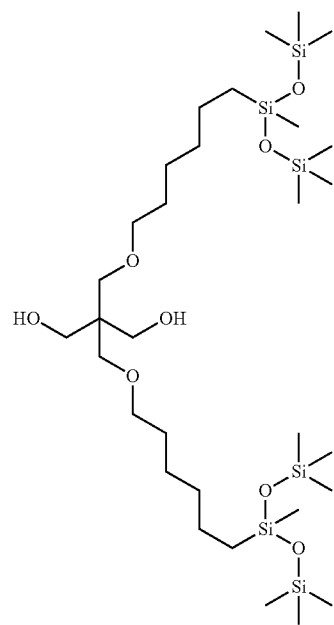

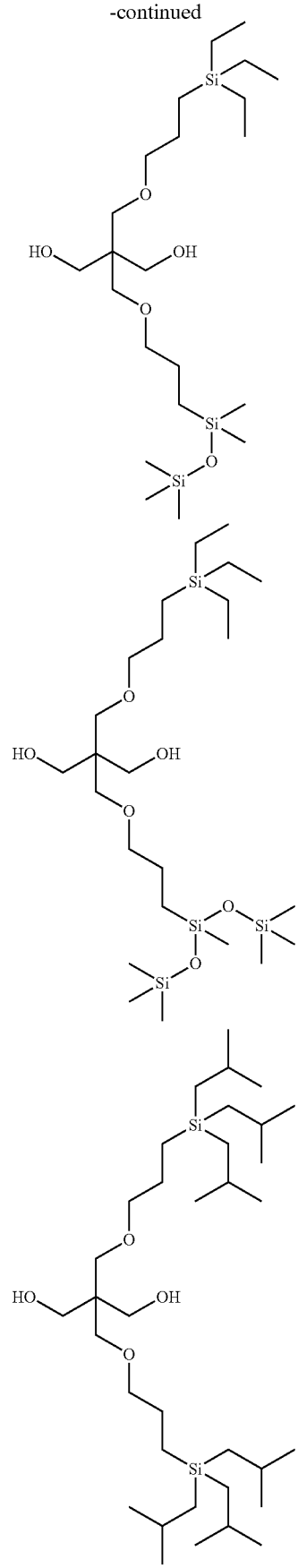
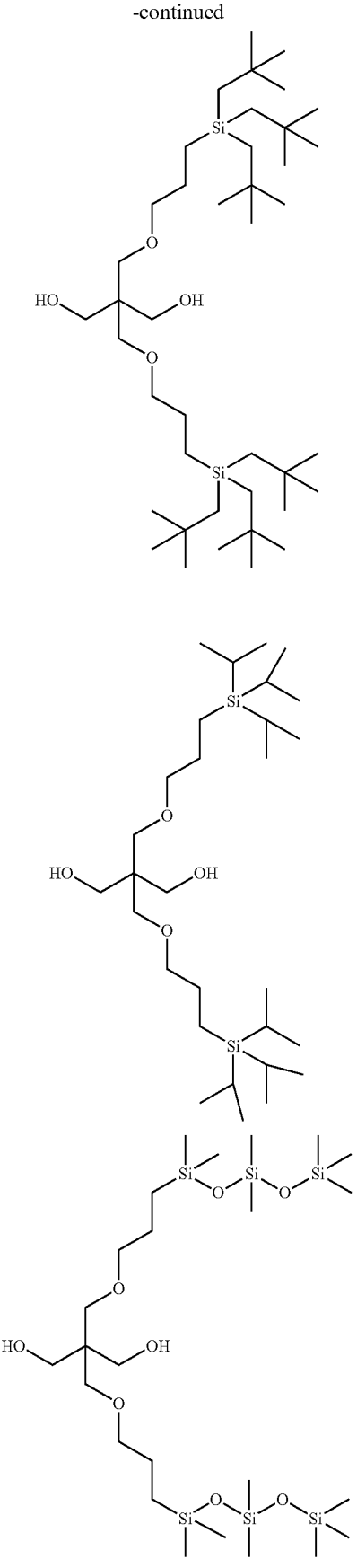

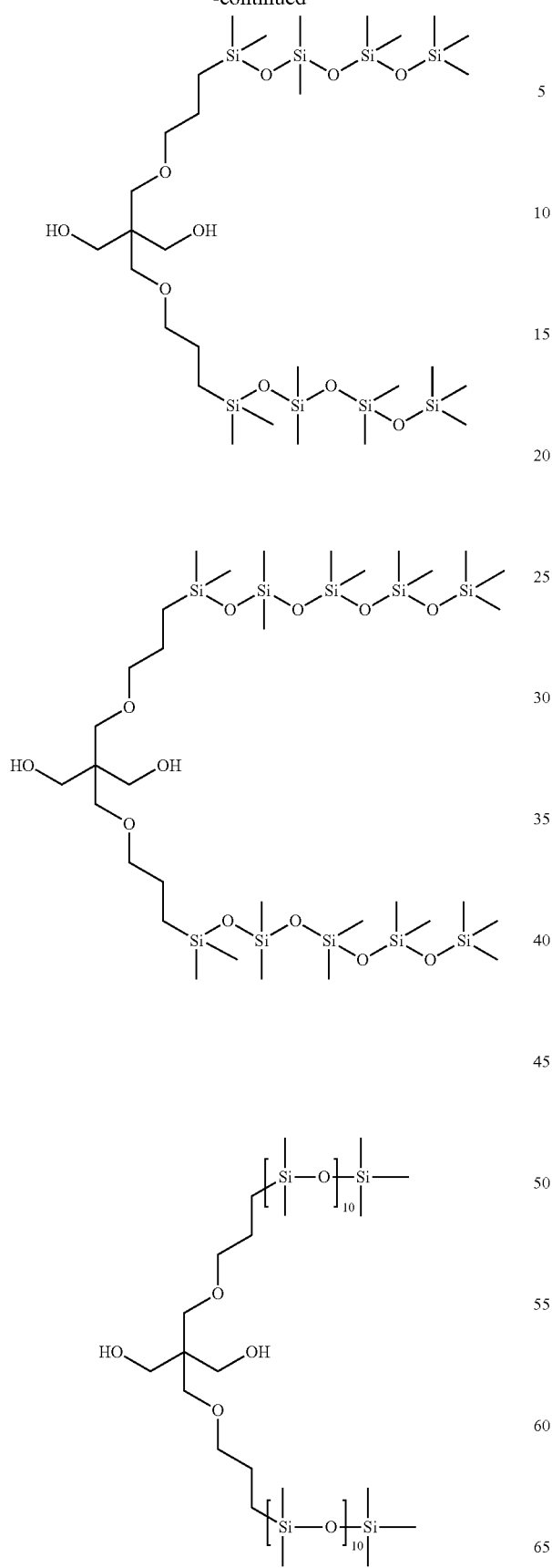

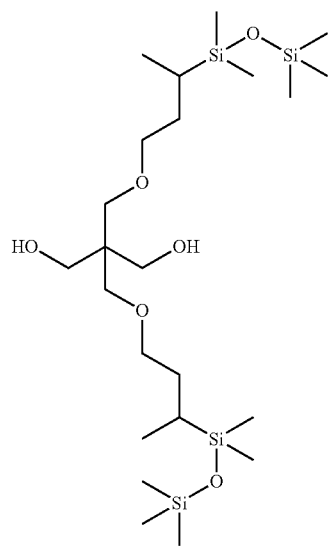
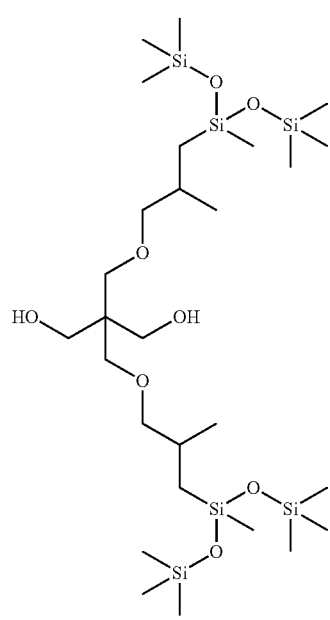 [SMILES: CC(C)(COCC(CO)(CO)COCC(C)(C)C[Si](C)(O[Si](C)(C)C)O[Si](C)(C)C)C[Si](C)(O[Si](C)(C)C)O[Si](C)(C)C]
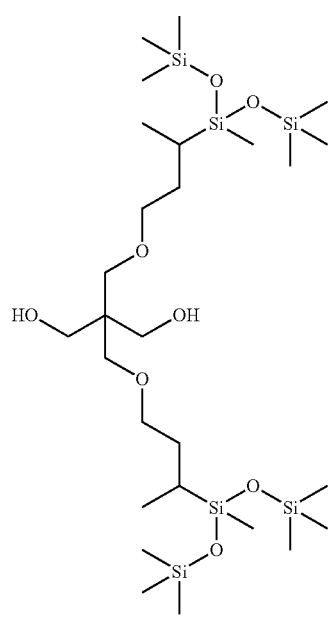
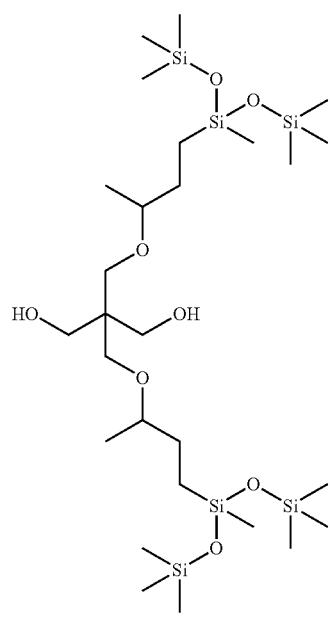

-continued

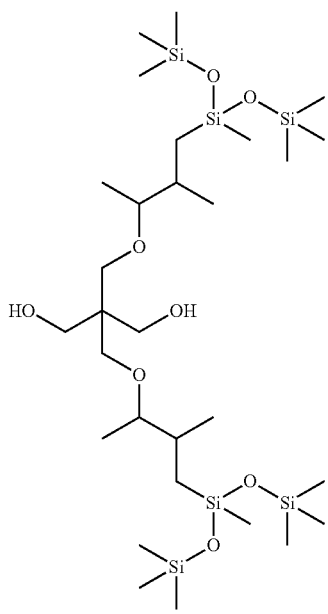

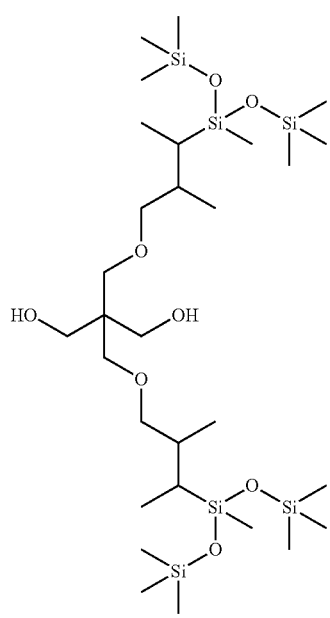

-continued

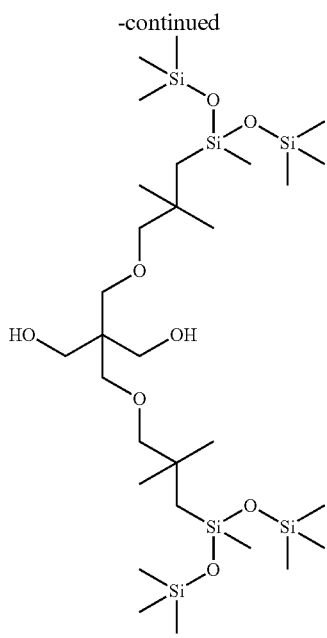

In each formula, the repeating unit represents the average value.

The resin having a structure shown by the general formula (1)-1, (1)-2, (2)-1, or (2)-2 contained in the inventive stretchable film can be formed by reaction of an isocyanate compound and a raw material of a compound having a silicon-containing group shown by the general formula (1)-1', (1)-2', (2)-1', or (2)-2'.

Illustrative examples of the isocyanate compound to be used for reaction with a compound shown by the general formula (1)-1', (1)-2', (2)-1', or (2)-2' include the following.

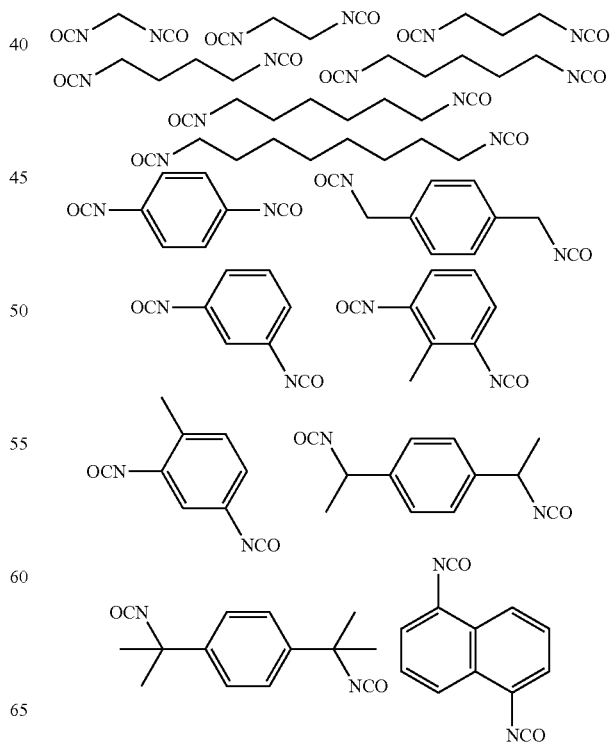

-continued
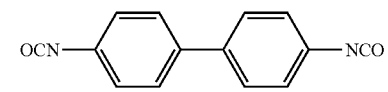
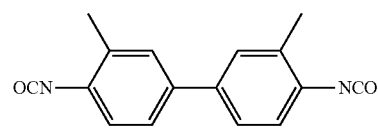
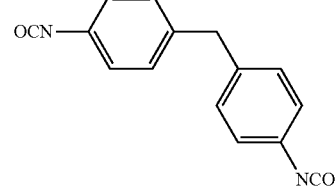
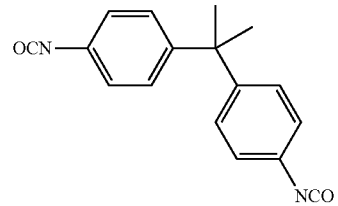
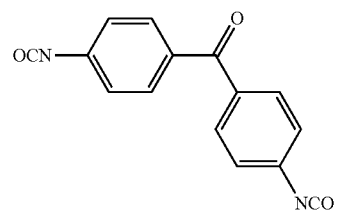
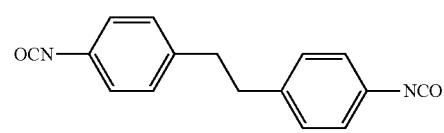
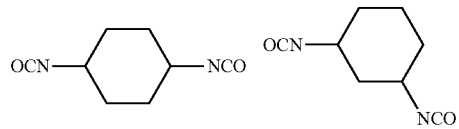
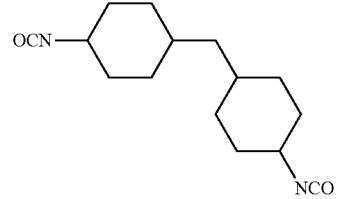
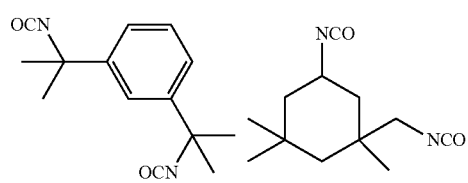
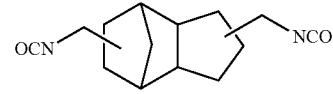
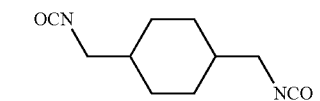
-continued
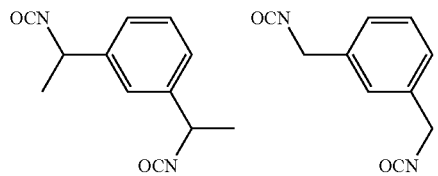
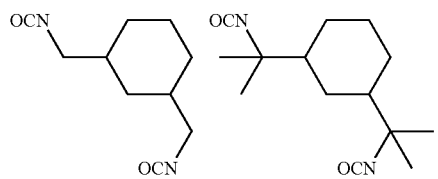
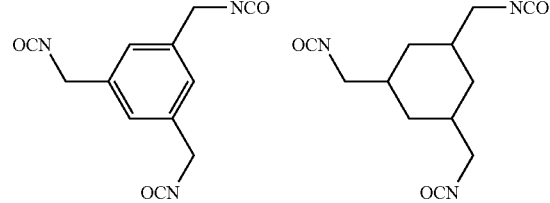
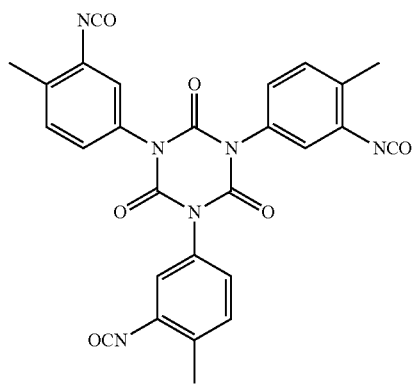
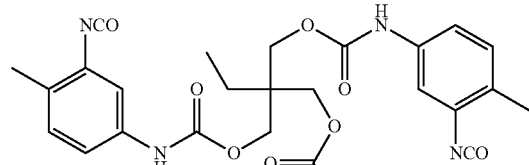
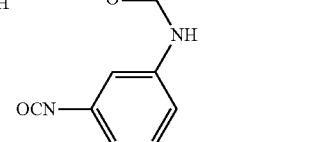
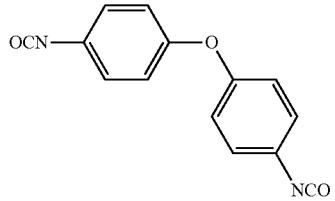

-continued

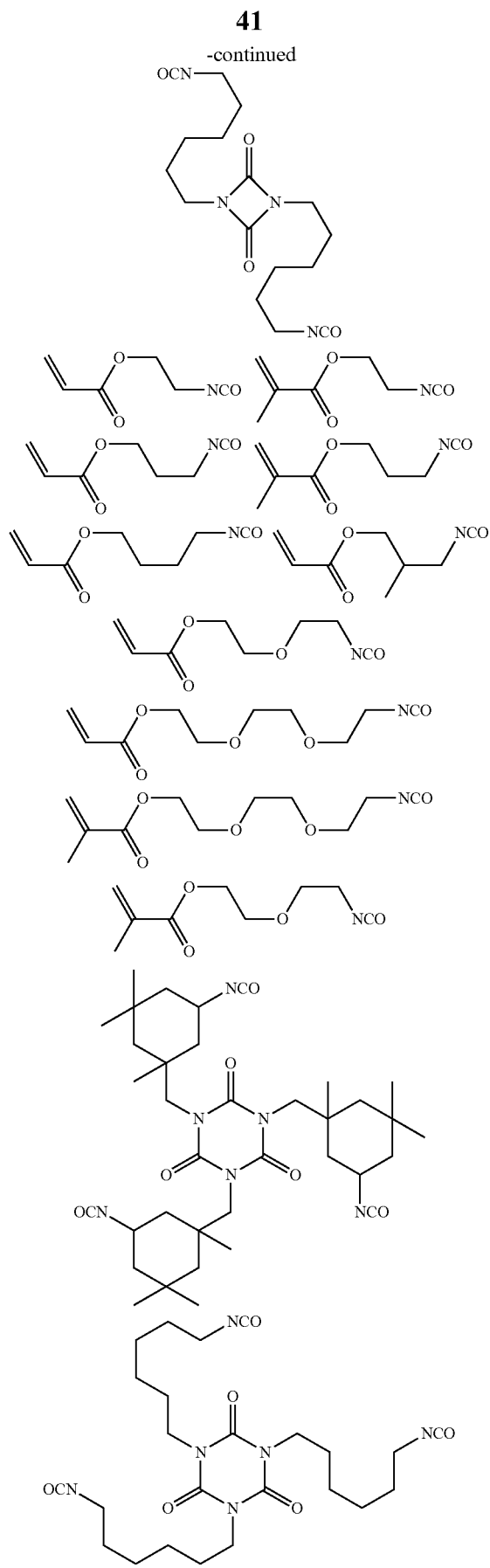

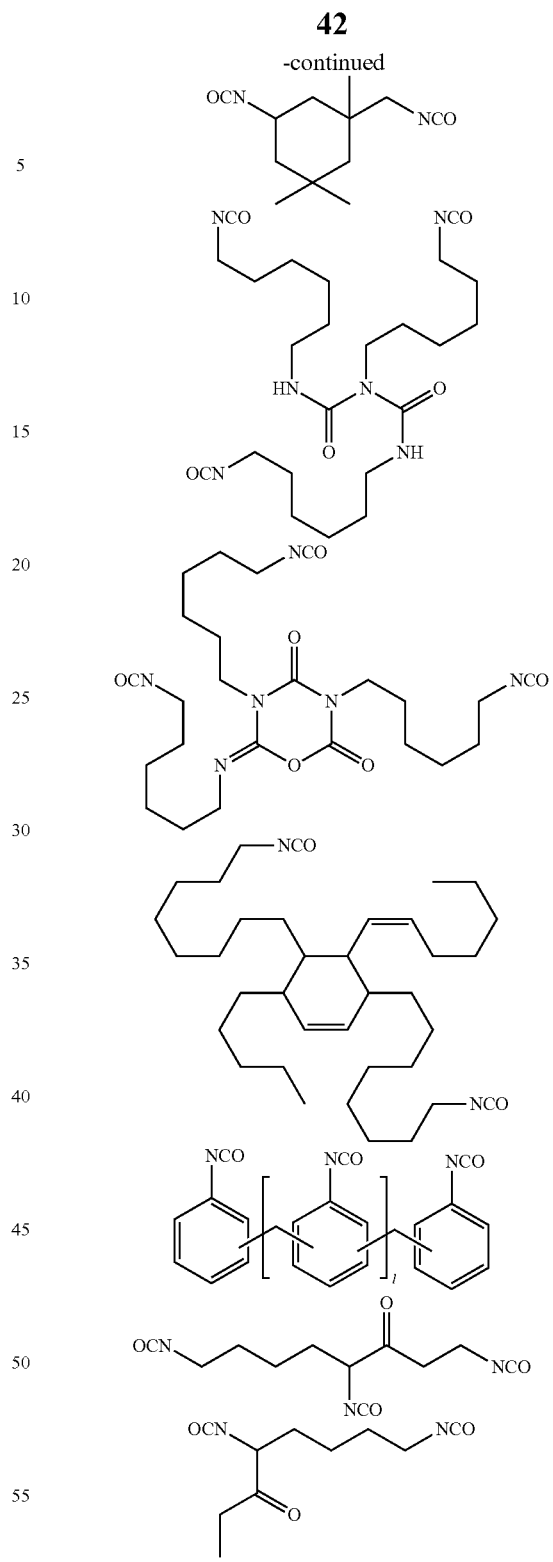

In the formula, "l" is an integer of 1 or more.

Among the isocyanate compounds described above, particularly, the isocyanate compounds having a (meth)acrylate group can give a compound having a (meth)acrylate group at the terminal shown by the general formula (3)-1, (3)-2, (4)-1, or (4)-2 through the reaction with a compound shown by the general formula (1)-1', (1)-2', (2)-1', or (2)-2'. It is also possible to obtain a compound having a (meth)acrylate group at the terminal shown by the general formula (3)-1, (3)-2, (4)-1, or (4)-2 by reaction of a compound having a (meth)acrylate group that has a hydroxy group with an isocyanate compound.

The isocyanate compounds described above have higher reactivity with a compound shown by the general formula (1)-1', (1)-2', (2)-1', or (2)-2', and the reaction is sometimes difficult to be controlled. The isocyanate compound can react with moisture in the air to inactivate the isocyanate groups during the storage, and have to be carefully stored such as sufficient moistureproofing. Accordingly, in order to prevent these phenomena, a compound having a blocked isocyanate group may be used, in which the isocyanate group is protected with a substituent.

The blocked isocyanate group is a blocked group that is deprotected by heating to be an isocyanate group. Illustrative examples thereof include isocyanate groups substituted with alcohol, phenol, thioalcohol, imine, ketimine, amine, lactam, pyrazole, oxime, and β-diketone.

A catalyst may be added to decrease the temperature for deprotecting the blocked isocyanate groups. Illustrative examples of the catalyst include organic tin such as dibutyltin dilaurate, bismuth salt, and zinc carboxylate such as zinc 2-ethylhexanoate and zinc acetate.

In particular, JP 2012-152725A shows that it is possible to decrease the temperature for deprotection reaction by including zinc carboxylate of α,β-unsaturated carboxylic acid as a blocked isocyanate dissociation catalyst.

In addition to the compound shown by the general formula (1)-1', (1)-2', (2)-1', or (2)-2' and the isocyanate compound, a compound having a plurality of hydroxy groups may be added. The addition of such a compound having a plurality of hydroxy groups induces chain extension and intermolecular crosslinking.

The stretchability and the strength can be improved by chain extension. For example, the stretchability is improved by introducing a chain extender of polyether type having hydroxy groups at the both terminals. Both of the stretchability and the strength can be improved by introducing a chain extender of polyester type having hydroxy groups at the both terminals, and the strength can be improved substantially by introducing a chain extender of polycarbonate type.

Illustrative examples of the compound having a plurality of hydroxy groups include the following.

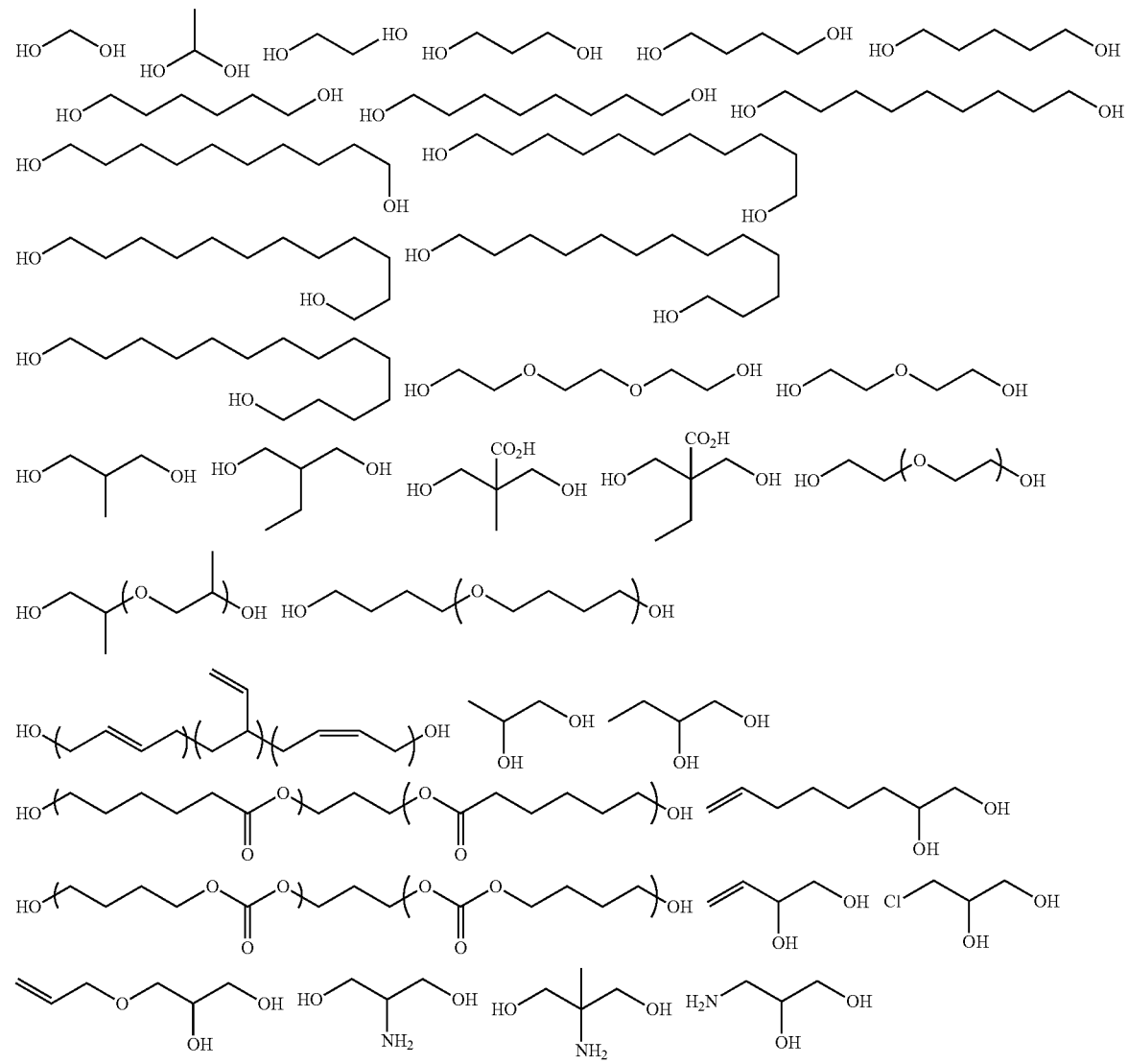

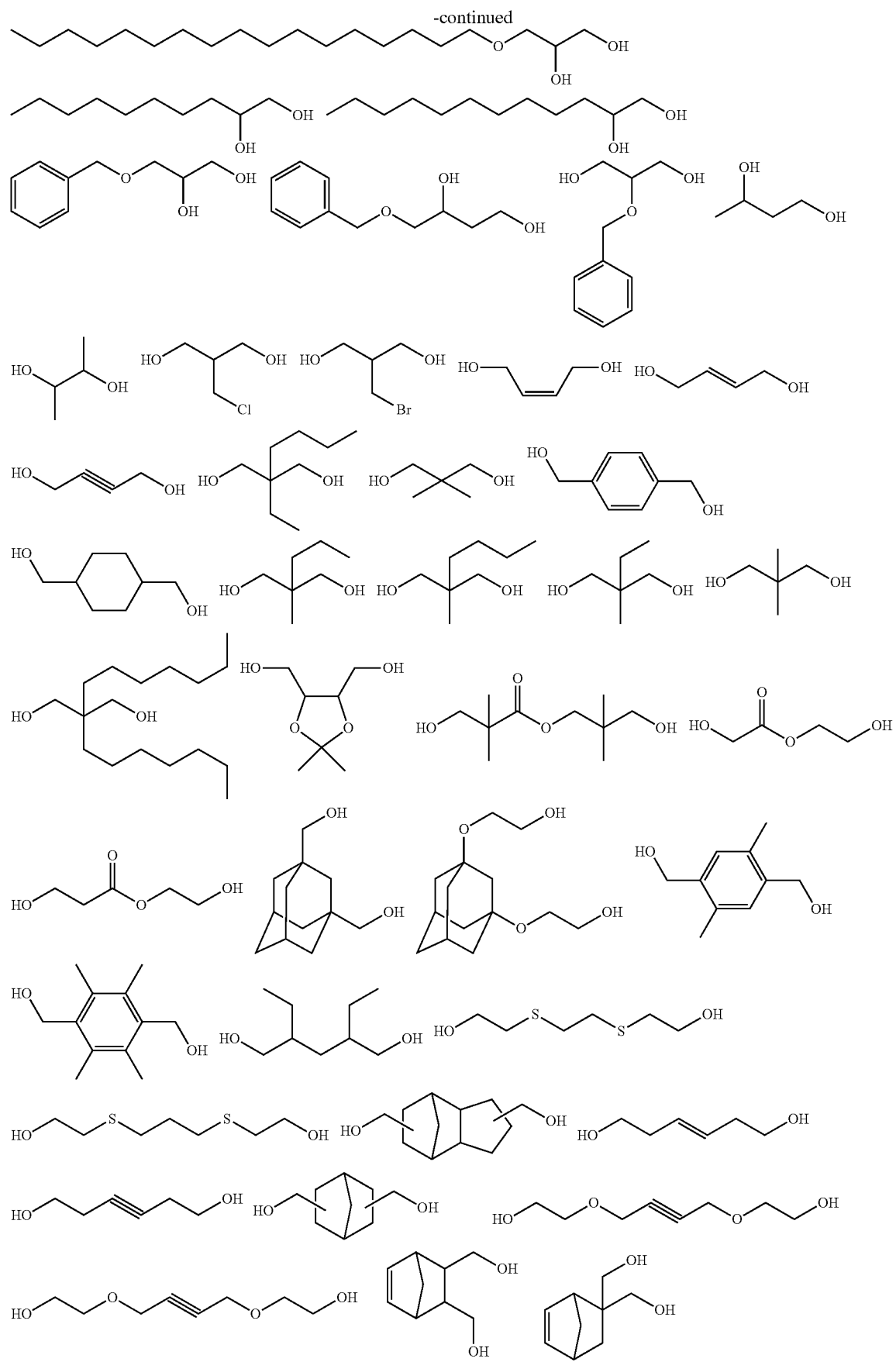

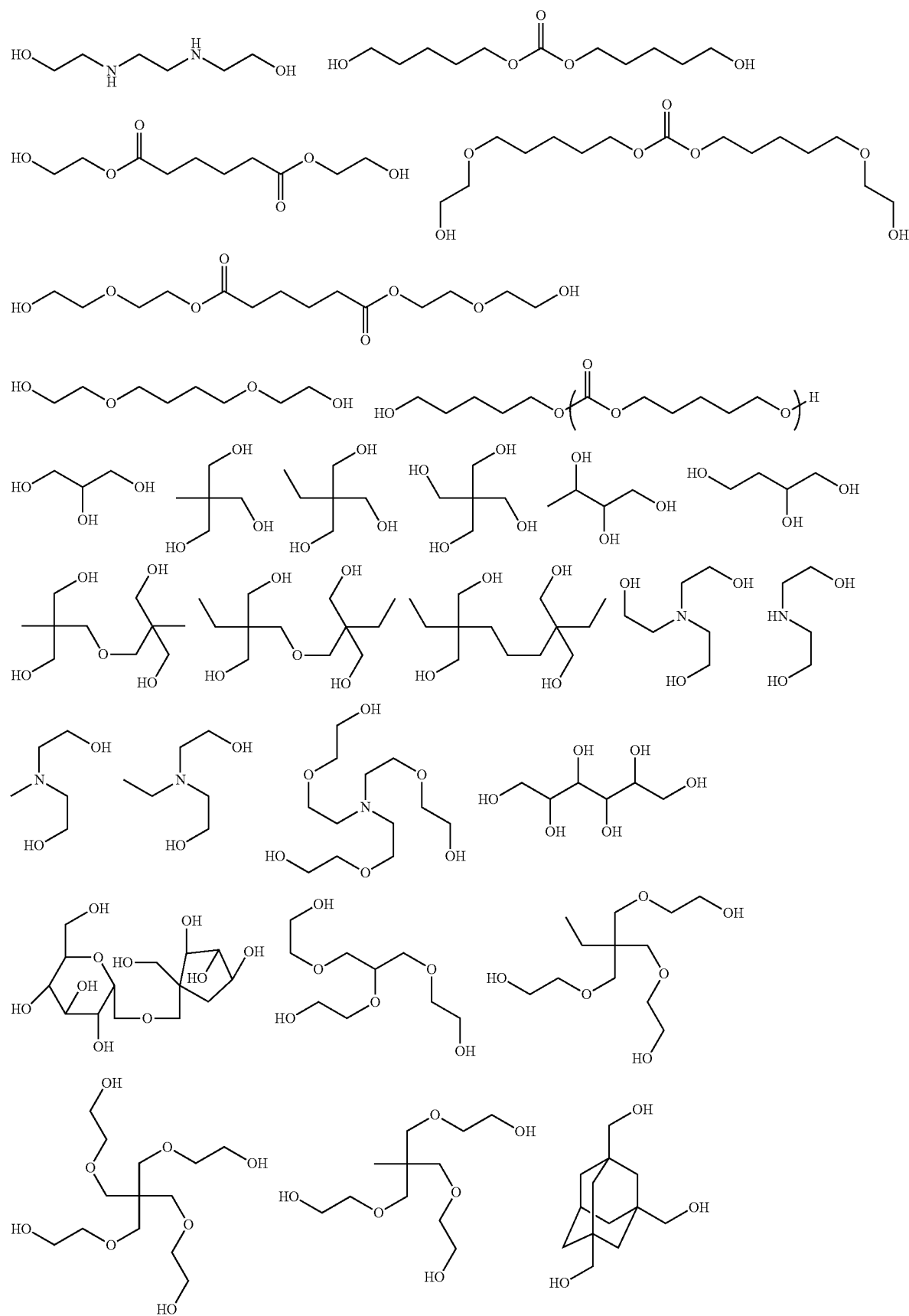

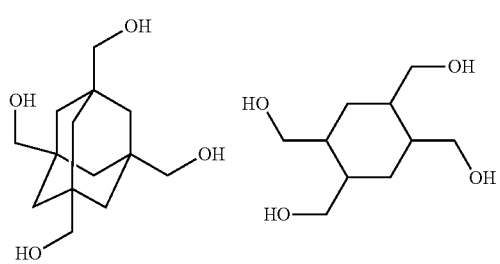
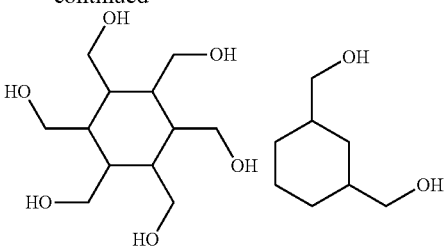

In the formulae, the numbers of the parenthesized repeating units are arbitrary numbers.

Additionally, a compound having an amino group can also be added. When an isocyanate group reacts with an amino group, a urea bond is formed. The moiety of a urethane bond and a urea bond is called as a hard segment, and improves the strength through the hydrogen bonds. The strength is successfully improved by the addition of urea bonds not only by urethane bonds.

The moiety formed of a diol compound that contains polyether, polyester, or polycarbonate for chain extension is called as a soft segment. Among them, most stretchable one is polyether, followed by polyester and polycarbonate, in which order the stretchability decreases. On the other hand, the order of tensile strength is in the opposite order to the order of stretchability. The strength and the stretchability can be controlled by selecting the kind of the soft segment or repeating unit.

The silicone urethane resin used for the inventive stretchable film preferably has a weight average molecular weight of 500 or more. They can be favorably used for the inventive stretchable film. The upper limit of the weight average molecular weight of the resin is preferably 500,000 or less.

It is to be noted that the inventive stretchable film preferably has a stretching property of 20 to 800% in a tensile test regulated by JIS K 6251. With such a stretching property, the stretchable film can be particularly preferably used as a coating film of a stretchable wiring.

The inventive stretchable film is preferably used for a film to be in contact with a conductive wiring having stretchability. The inventive stretchable film can be particularly favorably used for these uses.

The inventive stretchable film described above has excellent stretchability and strength that are equivalent to polyurethane, together with a film surface that has excellent water repellency and is free from stickiness equivalently to silicone.

<Method for Forming Stretchable Film>

The present invention also provides a method for forming a stretchable film comprising:

forming a silicone-pendant type urethane layer having a structure shown by the general formula (2)-1 and/or (2)-2 through curing by heating and/or light exposure; and forming a silicone main-chain type urethane layer having a structure shown by the general formula (1)-1 and/or (1)-2 on a surface of the silicone-pendant type urethane layer through curing by heating and/or light exposure.

In this case, it is preferable to form the first layer of the stretchable film to be a base by mixing a diol compound shown by the general formula (2)-1' and/or (2)-2' and a compound having an isocyanate group, together with a diol compound for chain extension, an amine compound, and a catalyst in case of needs, followed by film forming of the mixture and curing the same by heating or light exposure; and to form the second layer film on the first layer of the stretchable film to be a base by mixing a compound shown by the general formula (1)-1' and/or (1)-2' and a compound having an isocyanate group, together with a diol compound for chain extension, an amine compound, and a catalyst in case of needs, followed by film forming of the mixture and curing the same by heating or light exposure.

One of the example of such a method for forming a stretchable film is a method of mixing a compound shown by the general formula (2)-1' and/or (2)-2' or a compound shown by the general formula (1)-1' and/or (1)-2', a protected or unprotected isocyanate compound, and a compound having a plurality of hydroxy groups for chain extension or crosslinking, together with a compound having an amine group in case of needs, for example, for both of the first layer and the second layer; applying each mixture to a substrate as the first layer and onto the first layer as the second layer; followed by heat curing to form each film.

In this method, a polymer network is formed by increasing the molecular weight while forming urethane bonds through reaction of the isocyanate group and the hydroxy group. In case of adding a compound that has three or more hydroxy groups or isocyanate groups, crosslinking reaction proceeds to lower the stretchability, but to improve the film strength. Accordingly, it is possible to control the hardness, the stretchability, and the strength by controlling the amount of the compound having two or three hydroxy groups or isocyanate groups. Additionally, an independent stretchable film can be obtained by peeling the film from the substrate after being cured.

Regarding the molar ratio of the hydroxy groups and isocyanate groups in the mixture, it is preferable that the hydroxy groups and isocyanate groups be in the same molar amount, or the molar number of hydroxy groups be larger, that is, the value of the molar number of hydroxy groups divided by the molar number of isocyanate groups be 1 or more. When the molar number of isocyanate groups is smaller, carbon dioxide cannot be formed through the reaction of excess isocyanate groups with water, thereby allowing the film to prevent causing of voids due to foaming. Although foamed urethane is usually produced with excess isocyanate groups, the inventive stretchable film is preferably free from void due to foaming in the film since the property of higher strength is required.

When the resin in the inventive stretchable film is formed in condition that the molar number of hydroxy groups is larger than that of isocyanate groups as described above, the terminal of the polymer sometimes has a urethane bond which is formed only at one side of the diol compound as shown by the general formula (2')-1 or (2')-2:

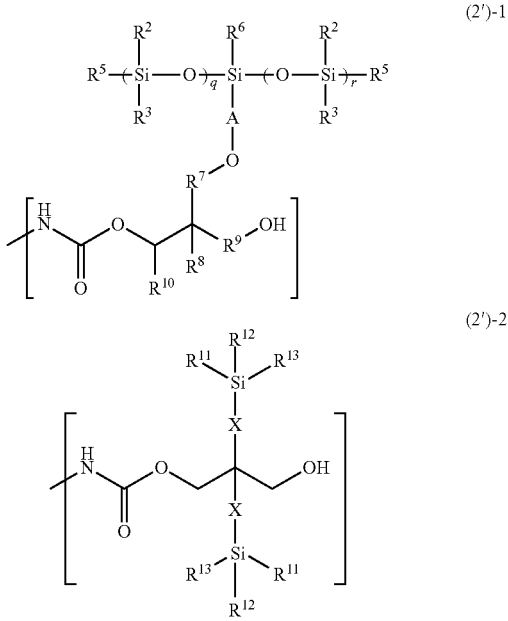

wherein $R^2$, $R^3$, $R^5$ to $R^{13}$, "A", X, "q", and "r" are the same as described above.

It is also possible to form a film by a prepolymer method in which a compound containing a hydroxy group and an isocyanate compound are mixed to form a polymer material (prepolymer), and then a compound containing a hydroxy group or a compound containing an isocyanate group is additionally mixed, and cured by heating. When the prepolymer is formed, either one of the compound containing a hydroxy group or the isocyanate compound is used in an excess amount to increase the molecular weight. This can decrease the amount of unreacted residual isocyanate to decrease the uncrosslinked portion to form a film with higher strength compared to the case of one shot method, in which the compound containing a hydroxy group and the isocyanate compound are mixed to form a film at once.

The heating temperature in curing is preferably in the range of room temperature to 200° C., more preferably in the range of 40 to 160° C. for a period in the range of 5 seconds to 60 minutes. The heat curing is performed either by covering one side of the film with a peeling film or by covering the both sides of the film therewith. It is preferable to cover one side in curing while being wound on a roll, and the both sides in batch curing, but the method is not limited thereto.

It is also possible to form a stretchable film by synthesizing a urethane polymer by reaction of isocyanate groups and hydroxy groups, forming a (meth)acrylate group at the terminal shown by the general formula(e) (3)-1, (3)-2, (4)-1, and/or (4)-2, forming a film from this polymer, and curing the same by heating and/or light exposure. Specifically, a protected or unprotected isocyanate compound and a compound having a plurality of hydroxy groups for chain extension or crosslinking are mixed with a diol compound shown by the general formula(e) (1)-1', (1)-2', (2)-1', and/or (2)-2', followed by polymerization to synthesize urethane (meth)acrylate polymer with the polymer terminal being (meth)acrylate. This is a method of forming a stretchable film by forming a film of urethane (meth)acrylate polymer, followed by curing the same by heating or light exposure. In this case, (meth)acrylate is crosslinked by reaction of radical. As a method for radical crosslinking, addition of a radical generator is desirable. The radical generator includes a thermal-radical generator, which generates a radical by thermal decomposition, and a photo-radical generator, which generates a radical by light exposure.

Illustrative examples of the heat radical generator include an azo radical generator and a peroxide radical generator. Illustrative examples of the azo radical generator include 2,2'-azobisisobutyronitrile (AIBN), 2,2'-azobis(2,4-dimethylvaleronitrile), dimethyl 2,2'-azobis(2-methylpropionate), 2,2'-azobis(4-methoxy-2,4-dimethylvaleronitrile), 2,2'-azobis(cyclohexane-1-carbonitrile), and 4,4'-azobis(4-cyanovaleric acid). Illustrative examples of the peroxide radical generator include benzoyl peroxide, decanoyl peroxide, lauroyl peroxide, succinyl peroxide, t-butylperoxy-2-ethylhexanoate, t-butylperoxypivaloate, and 1,1,3,3-tetramethylbutylperoxy-2-ethylhexanoate.

Illustrative examples of the photo radical generator include acetophenone, 4,4'-dimethoxybenzyl, benzyl, benzoin, benzophenone, 2-benzoylbenzoic acid, 4,4'-bis(dimethylamino)benzophenone, 4,4'-bis(diethylamino)benzophenone, benzoin methyl ether, benzoin ethyl ether, benzoin isopropyl ether, benzoin butyl ether, benzoin isobutyl ether, 4-benzoylbenzoic acid, 2,2'-bis(2-chlorophenyl)-4,4',5,5'-tetraphenyl-1-2'-biimidazole, methyl 2-benzoylbenzoate, 2-(1,3-benzodioxole-5-yl)-4,6-bis(trichloromethyl)-1,3,5-triazine, 2-benzyl-2-(dimethylamino)-4'-morpholinobutyrophenone, 4,4'-dichlorobenzophenone, 2,2-diethoxyacetophenone, 2,2-dimethoxy-2-phenylacetophenone, 2,4-diethylthioxanthen-9-one, diphenyl(2,4,6-trimethylbenzoyl) phosphine oxide, 1,4-dibenzoylbenzene, 2-ethylanthraquinone, 1-hydroxycyclohexyl phenyl ketone, 2-hydroxy-2-methylpropiophenone, 2-hydroxy-4'-(2-hydroxyethoxy)-2-methylpropiophenone, 2-isonitrosopropiophenone, 2-phenyl-2-(p-toluenesulfonyloxy)acetophenone (BAPO), and camphorquinone.

It is to be noted that the loading amount of the thermal-radical generator or the photo-radical generator is preferably in the range of 0.1 to 50 parts by mass based on 100 parts by mass of the resin.

It is also possible to add a crosslinking agent that has a plurality of (meth)acrylate or thiol. This makes it possible to improve the efficiency of radical crosslinking.

It is also possible to add a monomer that has an alkyl group or an aryl group, or a monomer that has an alkyl group or an aryl group substituted with a silicon-containing group or a fluorine. This makes it possible to decrease the viscosity of the solution to form a stretchable film with thinner thickness. When these monomers each have a polymerizable double bond, they can be fixed into the film in curing the film.

Illustrative examples of the monomer that has an alkyl group or an aryl group include isobornyl acrylate, lauryl acrylate, tetradecyl acrylate, stearyl acrylate, isostearyl acrylate, behenyl acrylate, adamantane acrylate, phenoxyethylene glycol acrylate, phenoxydiethylene glycol acrylate, and 2 to 6 functional acrylates. Illustrative examples of the bifunctional acrylate include 1,6-hexanediol diacrylate, 1,9-nonanediol diacrylate, isononanediol diacrylate, 1,10-decanediol diacrylate, neopentyl glycol diacrylate, 2-hydroxy-3-methacrylpropyl acrylate, diethylene glycol diacrylate, triethylene glycol diacrylate, polyethylene glycol diacrylate, dipolyethylene glycol diacrylate, tripropylene glycol diacrylate, polypropylene glycol diacrylate, polytetramethylene glycol diacrylate, polyethylene polypropylene glycol diacrylate, dioxane glycol diacrylate, tricyclodecanedimethanol diacrylate, 9,9-bis[4-(2-hydroxyethoxy)phenyl]fluorene diacrylate, ethoxylated bisphenol A diacrylate, propoxylated bisphenol A diacrylate, and ethoxylated propoxylated bisphenol A diacrylate. Illustrative examples of trifunctional acrylate include trimethylolpropane triacrylate, ethoxylated trimethylolpropane triacrylate, propoxylated trimethylolpropane triacrylate, glycerin triacrylate, ethoxylated glycerin triacrylate, propoxylated glycerin triacrylate, tris(2-acryloxyethyl)isocyanurate, caprolactone modified tris(2-acryloxyethyl)isocyanurate, and pentaerythritol triacrylate. Illustrative examples of tetrafunctional acrylate include pentaerythritol tetraacrylate, ethoxylated pentaerythritol tetraacrylate, propoxylated pentaerythritol tetraacrylate, ditrimethylolpropane tetraacrylate, ethoxylated ditrimethylolpropane tetraacrylate, and propoxylated ditrimethylolpropane tetraacrylate. Illustrative examples of penta- or hexa-functional acrylate include dipentaerythritol polyacrylate, ethoxylated dipentaerythritol polyacrylate, and propoxylated dipentaerythritol polyacrylate. It is also possible to use a monomer in which the above acrylate is replaced by methacrylate.

When a stretchable film is formed using a compound that has a (meth)acrylate group at the terminal, the curing can be performed by combining heat-curing and photo-curing. For example, it is possible to form a stretchable film of the base by heat-curing previously, and to form a stretchable film on that film by photo-curing. The merits of photo-curing is that heating is not necessarily essential and curing can be performed in a short period. The demerit thereof is that the area where light does not reach cannot be cured. When heat-curing and photo-curing are combined, it is possible to select a method for curing in which each merit is applied.

For example, the stretchable film can be formed by coating a substrate with a solution in which the base polymer shown by the general formula (4)-1 or (4)-2 and a radical generator are mixed, curing the same by heat or light exposure to form the first layer, coating the top with a solution in which the base polymer shown by the general formula (3)-1 or (3)-2 and a radical generator are mixed to apply the second layer, and curing the same by heat or light exposure.

It is possible to form the first layer by curing the mixture of a diol compound shown by the general formula (2)-1' or (2)-2', a protected or unprotected isocyanate compound, a compound having a plurality of hydroxy groups for chain extension or crosslinking, and a compound having an amino group in case of needs; and to form the second layer by applying a solution in which a base polymer shown by the general formula (3)-1 or (3)-2 and a radical generator are mixed, followed by heat or photo-curing of the same. It is also possible to form the first layer by applying a solution in which a base polymer shown by the general formula (4)-1 or (4)-2 and a radical generator are mixed, followed by heat or photo-curing of the same; and to form the second layer by curing the mixture of a diol compound shown by the general formula (1)-1' or (1)-2', a protected or unprotected isocyanate compound, a compound having a plurality of hydroxy groups for chain extension or crosslinking, and a compound having an amino group in case of needs.

The methods of forming the first layer of the inventive stretchable film include a method of applying the composition onto a planer substrate or a roll. Illustrative examples of the method for applying the composition include spin coating, bar coating, roll coating, flow coating, dip coating, spray coating, and doctor coating. The coating is preferably performed so as to have a coating film thickness of 1 μm to 2 mm.

For encapsulating a part with unevenness, it is preferable to use a method such as roll coating and spray coating, or a method for coating a part that requires to be coated by screen printing, etc. In order to perform various coating or printing, the viscosity of the mixed solution have to be controlled. When lower viscosity is required, organic solvent may be added; when higher viscosity is required, filler such as silica is mixed.

The organic solvent is preferably an organic solvent with the boiling point being in the range of 115 to 200° C. at atmospheric pressure. It is preferable to use one or more organic solvents selected from 2-octanone, 2-nonanone, 2-heptanone, 3-heptanone, 4-heptanone, 2-hexanone, 3-hexanone, diisobutyl ketone, methylcyclohexanone, acetophenone, methylacetophenone, propyl acetate, butyl acetate, isobutyl acetate, amyl acetate, butenyl acetate, isoamyl acetate, phenyl acetate, propyl formate, butyl formate, isobutyl formate, amyl formate, isoamyl formate, methyl valerate, methyl pentenoate, methyl crotonate, ethyl crotonate, propylene glycol monomethyl ether, ethylene glycol monomethyl ether, propylene glycol monoethyl ether, ethylene glycol monoethyl ether, propylene glycol dimethyl ether, diethylene glycol dimethyl ether, propylene glycol monomethyl ether acetate, and propylene glycol monoethyl ether acetate.

In case of curing of the compound that has a (meth) acrylate group at the terminal by heating, the heat curing can be performed with a hot plate, in an oven, or by irradiation of far infrared ray, for example. The heating condition is preferably at 30 to 150° C. for 10 seconds to 60 minutes, more preferably 50 to 120° C. for 30 seconds to 20 minutes. The baking may be performed in any environment such as in the atmosphere, in an inert gas, or in vacuum.

In case of curing of the compound that has a (meth) acrylate group at the terminal by light exposure, the light exposure is preferably performed with a light having a wavelength of 200 to 500 nm. As the light source, a halogen lamp, a xenon lamp, excimer laser, a metal halide lamp, and LED can be used, for example. Irradiation with electron beam is also preferable. The irradiation quantity is preferably in the range of 1 mJ/cm$^2$ to 100 J/cm$^2$.

The inventive stretchable film is a stretchable film in which the silicone main-chain type urethane layer having a structure shown by the general formula (1)-1 and/or (1)-2 is formed on the surface of the silicone-pendant type urethane layer having a structure shown by the general formula (2)-1 and/or (2)-2, in which either the both or one of the surfaces of the silicone-pendant type urethane layer may be coated with the silicone main-chain type urethane layer. The film thickness of the silicone main-chain type urethane layer is not particularly limited, but is preferable to be thinner than that of the silicone-pendant type urethane layer in view of obtaining higher strength.

In order to form a thin film of the silicone main-chain type urethane layer, it is preferable to mix the organic solvent described above. In the solution for the silicone-pendant type urethane layer, it does not matter whether an organic solvent is contained or not.

The inventive stretchable film can be formed on fiber or a membrane film, not only used solely as a self-standing film.

Figure 2:
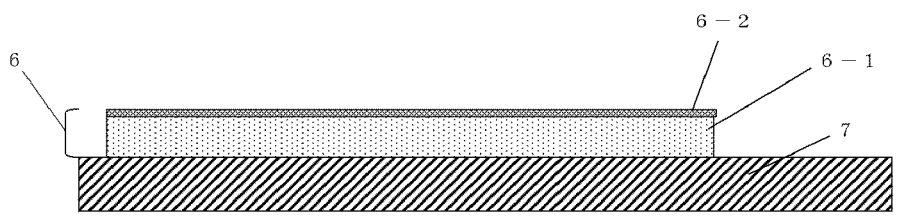
FIG. 2 is a cross-sectional view showing the state of forming a stretchable film of the present invention on a substrate.
Figure 3:
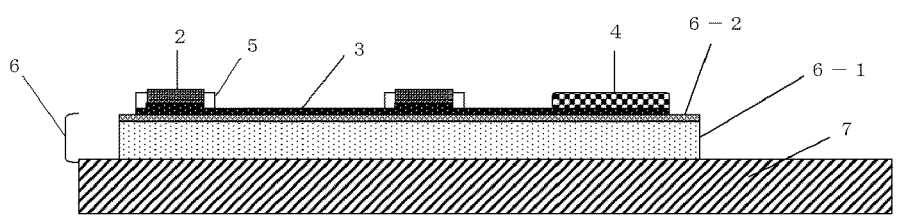
FIG. 3 is a cross-sectional view showing the state of forming an electrocardiograph on a stretchable film of the present invention.
Figure 4:
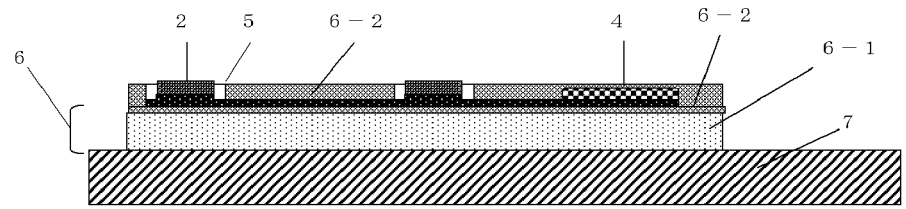
FIG. 4 is a cross-sectional view showing the state of covering the wiring and the center device in FIG. 3 with the second layer of a stretchable film.

Examples of using the inventive stretchable film are shown in FIGS. 1 to 7. FIG. 1 is a schematic illustration of an electrocardiograph 1 formed on a stretchable film 6 of the present invention viewed from a bio-electrode side. FIG. 2 is a cross-sectional view showing the state of forming the stretchable film 6 of the present invention on a substrate 7;

FIG. 3 is a cross-sectional view showing the state of forming the electrocardiograph 1 on the stretchable film 6 of the present invention; FIG. 4 is a cross-sectional view showing the state of covering the stretchable wiring 3 and the center device 4 of the electrocardiograph 1 in FIG. 3 with the stretchable film 6, in which the electrocardiograph 1 in FIG. 1 is the similar one described in Patent Document 1. As shown in FIG. 1, in the electrocardiograph 1, three bio-electrodes 2 are linked to the wiring 3, which conducts electric signals, and are connected to the center device 4.

As the material of the wiring 3, electrically conductive material are generally used, including metal such as gold, silver, platinum, titanium, and stainless as well as carbon. The wiring 3 can be a meandering-shape as described in Patent Literature 1 to provide stretchability, and can be formed by pasting powder of the electrically conductive material or wire of the electrically conductive material on a stretchable film, printing electrically conductive ink that contains the electrically conductive material on a stretchable film, or using an electrically conductive fabric in which electrically conductive material and fibers are combined.

Since the electrocardiograph 1 have to be attached to skin, an adhesive part 5 is disposed around the bio-electrode 2 in FIGS. 3 and 4 in order not to separate the bio-electrode 2 from skin. Incidentally, when the bio-electrode 2 has adhesiveness, the surrounding adhesive part 5 is not necessarily essential.

This electrocardiograph 1 is formed on the stretchable film 6, which is the stretchable film of the present invention, as shown in FIG. 1. Having little stickiness on the surface, the stretchable film 6 shows favorable printing plate-release when printing is performed thereon by screen printing and so on. Ill printing plate-release is unfavorable since it causes ink-release when the printing plate is released, thereby failing to transfer the ink onto the stretchable film.

Moreover, the stretchable wiring 3 can be covered with the stretchable film 6. The stretchable film 6 in this case is not necessarily a composite type, and may be a film that only has one layer of either the first stretchable film layer 6-1 or the second stretchable film layer 6-2. Incidentally, in FIG. 4, the wiring 3 is covered with the second stretchable film layer 6-2.

Figure 5:
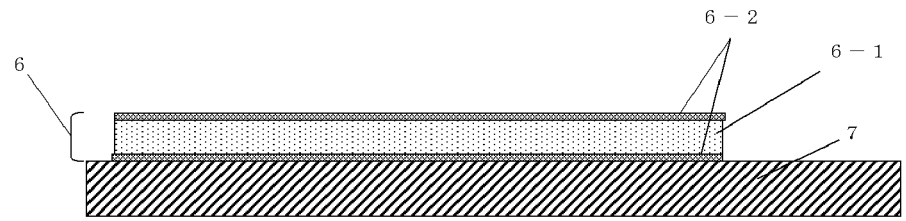
FIG. 5 is a cross-sectional view showing the state of covering the both sides of the first layer of a stretchable film with the second layers of the stretchable film.
Figure 6:
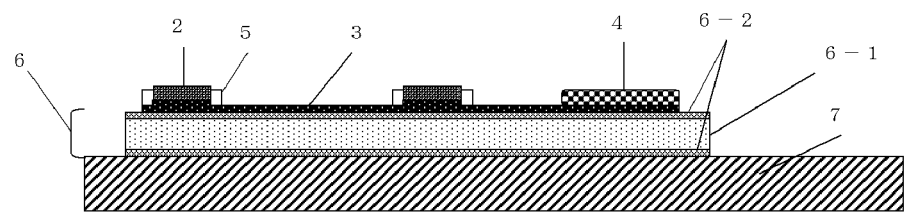
FIG. 6 is a cross-sectional view showing the state of forming an electrocardiograph on the stretchable film in FIG. 5.
Figure 7:
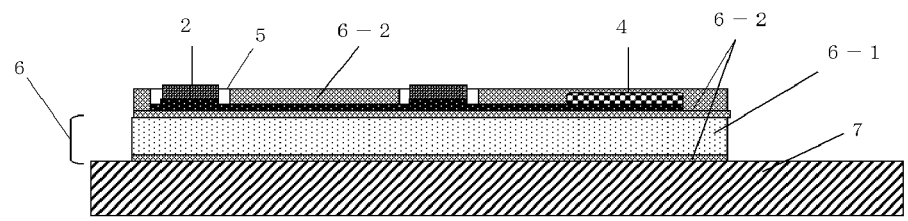
FIG. 7 is a cross-sectional view showing the state of covering the wiring and the center device in FIG. 6 with the second layer of a stretchable film.

Furthermore, it is also possible to form a stretchable film as shown in FIG. 5 by inverting the stretchable film formed in FIG. 2 to form the second stretchable film layer 6-2 at the surface of the first stretchable film 6-1 where the second stretchable film layer 6-2 has not been formed. The cross-sectional view of an electrocardiograph using the stretchable film in this case is shown in FIG. 6 or FIG. 7.

The inventive method for forming a stretchable film described above makes it possible to easily form a stretchable film that has excellent stretchability and strength equivalent to or superior to those of polyurethane, with the film surface having higher water repellency and low tackiness.

Examples

Hereinafter, the present invention will be specifically described with reference to Examples and Comparative Examples, but the present invention is not limited thereto. Incidentally, the weight average molecular weight (Mw) represents a weight average molecular weight in terms of polystyrene determined by gel permeation chromatography (GPC).

Silicone pendant silicone diol compounds-1 to 5, Silicone diol compound-1, Silicone compound-1, Isocyanate compounds-1 to 5, and Hydroxy compounds-1 to 5 blended into each composition for forming a stretchable film are shown as follows.

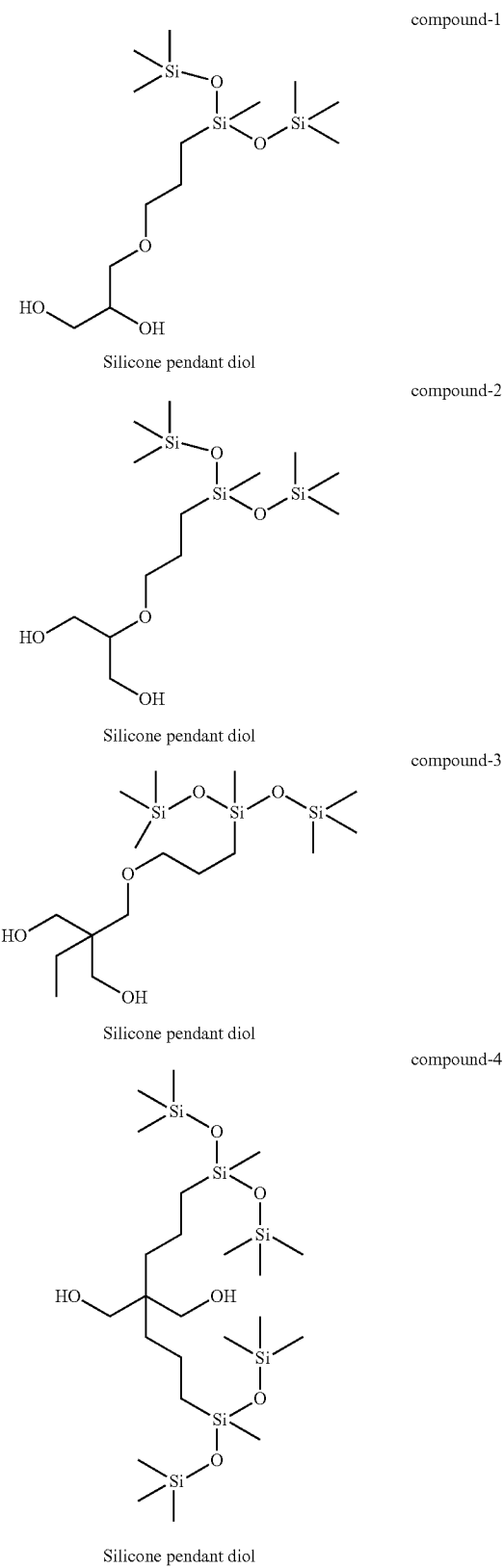

compound-5

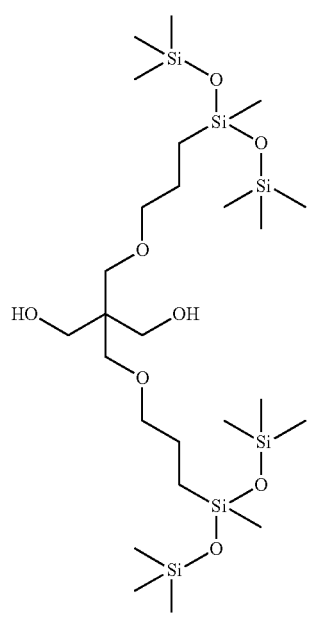

Silicone pendant diol compound-1

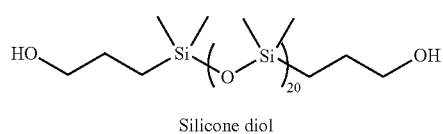

Silicone diol compound-1

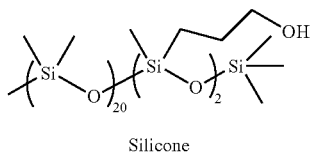

Silicone

In the formulae, the number of repeating units each represent the average value.

Isocyanate compound-1

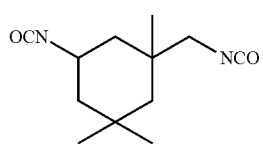

Isocyanate compound-2

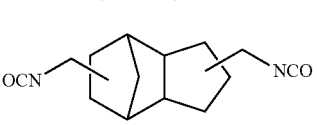

Isocyanate compound-3

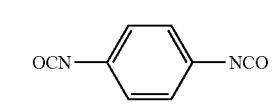

Isocyanate compound-4

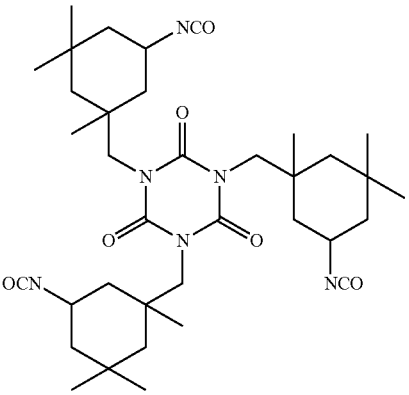

Isocyanate compound-5

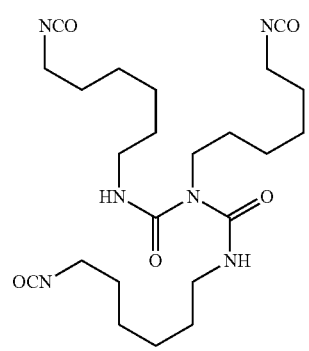

Hydroxy compound-1

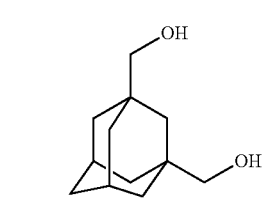

Hydroxy compound-2

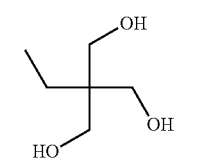

Hydroxy compound-3

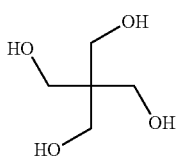

Hydroxy compound-4

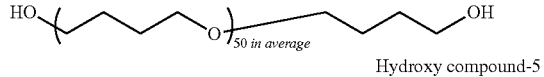

Hydroxy compound-5

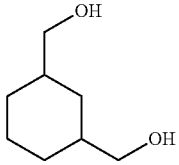

Silicone-pendant urethane-(meth)acrylates-1 to 8 and Silicone urethane-(meth)acrylates-1 to 3 blended into each composition for forming a stretchable film as a compound having a (meth)acrylate at the terminal are shown as follows.

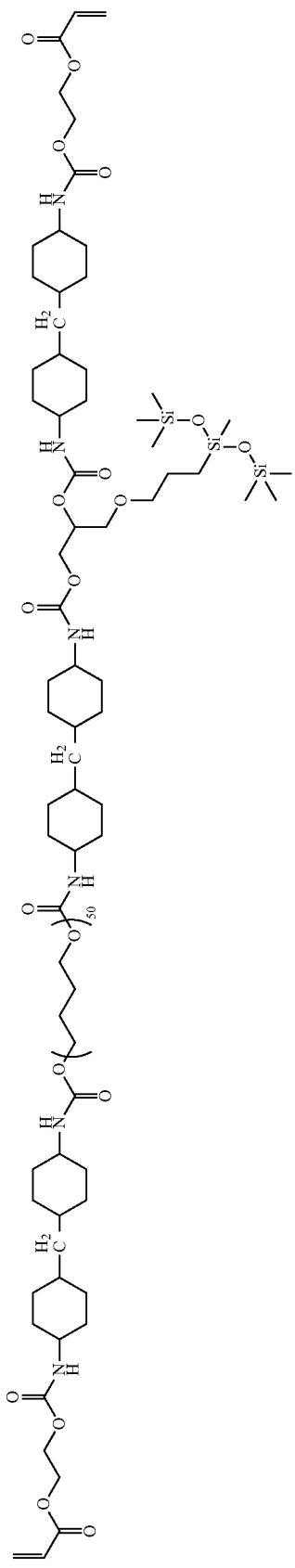
Silicone-pendant urethane-(meth) acrylate-1
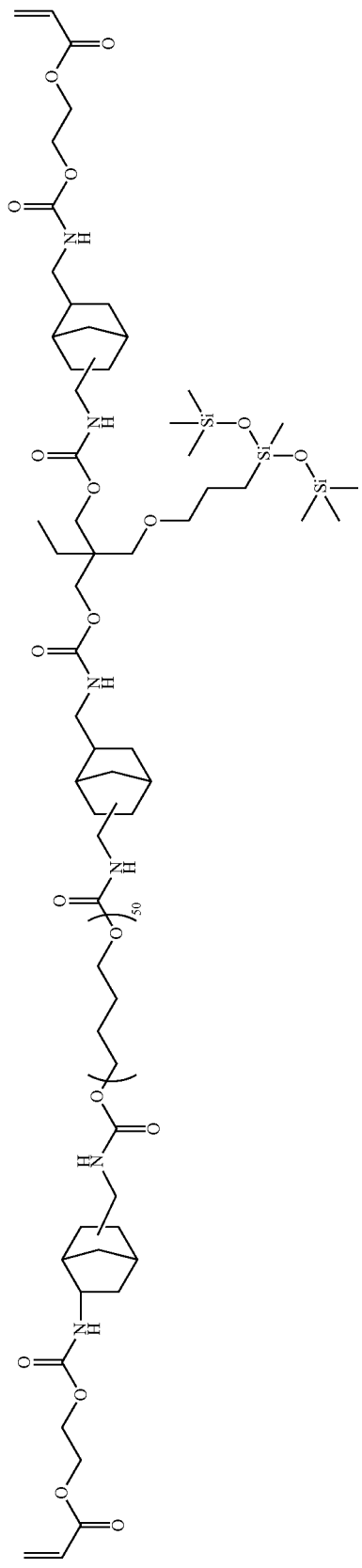
Silicone-pendant urethane-(meth) acrylate-2

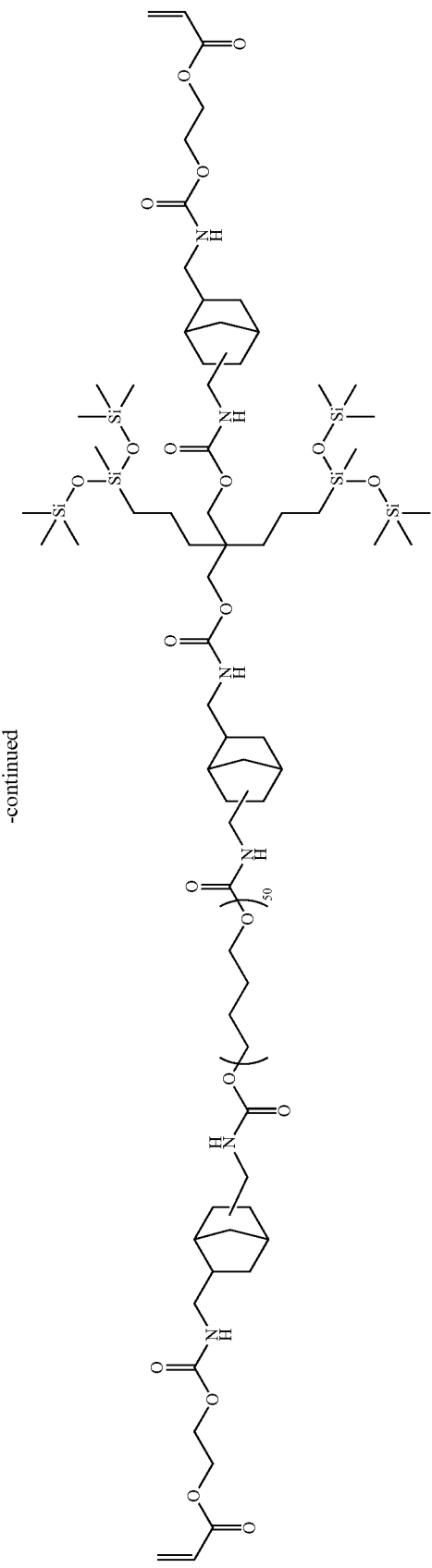
Silicone-pendant urethane-(meth) acrylate-3
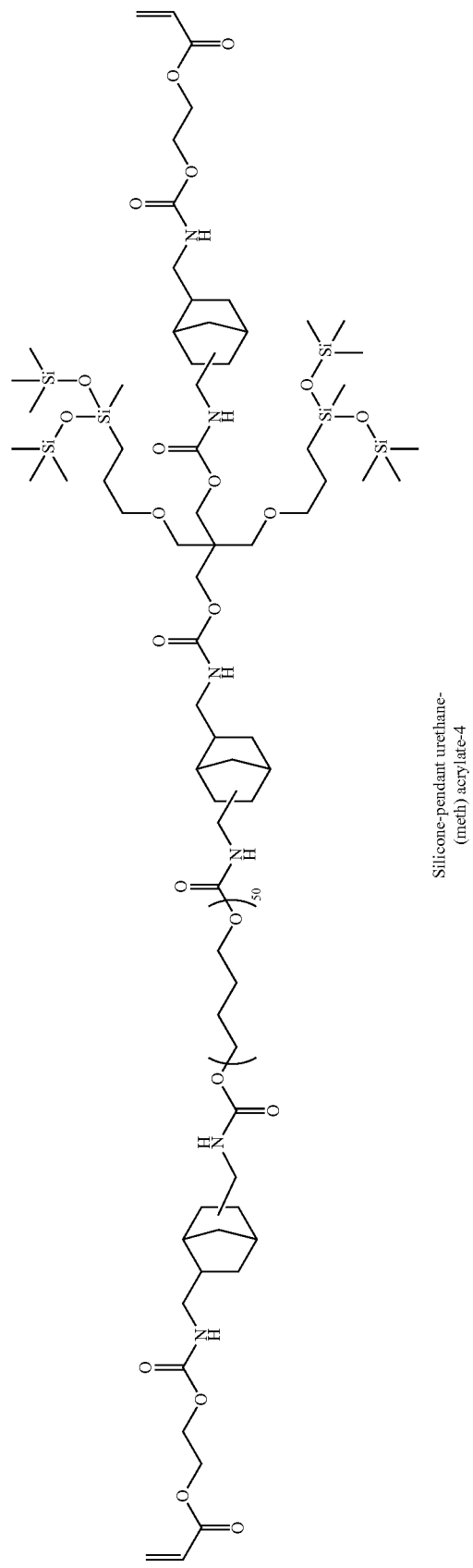
Silicone-pendant urethane-(meth) acrylate-4

-continued
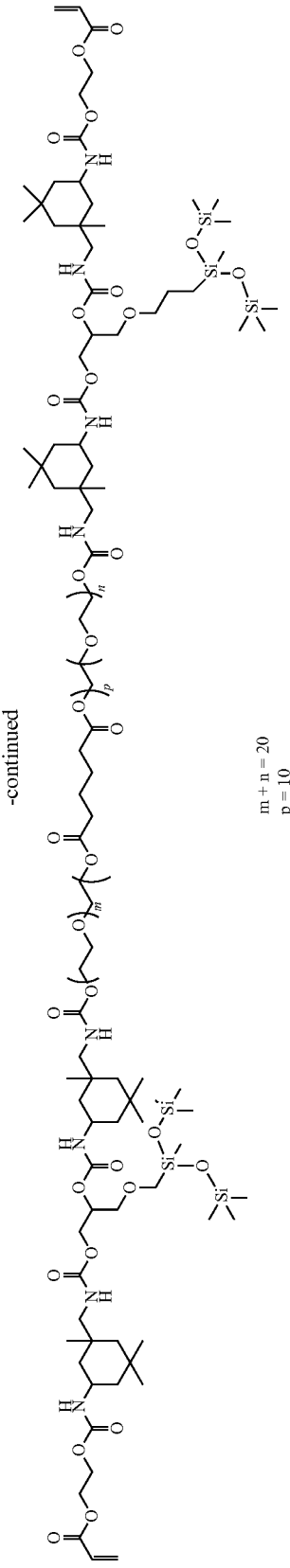
m + n = 20
p = 10
average
Silicone-pendant urethane-(meth) acrylate-5
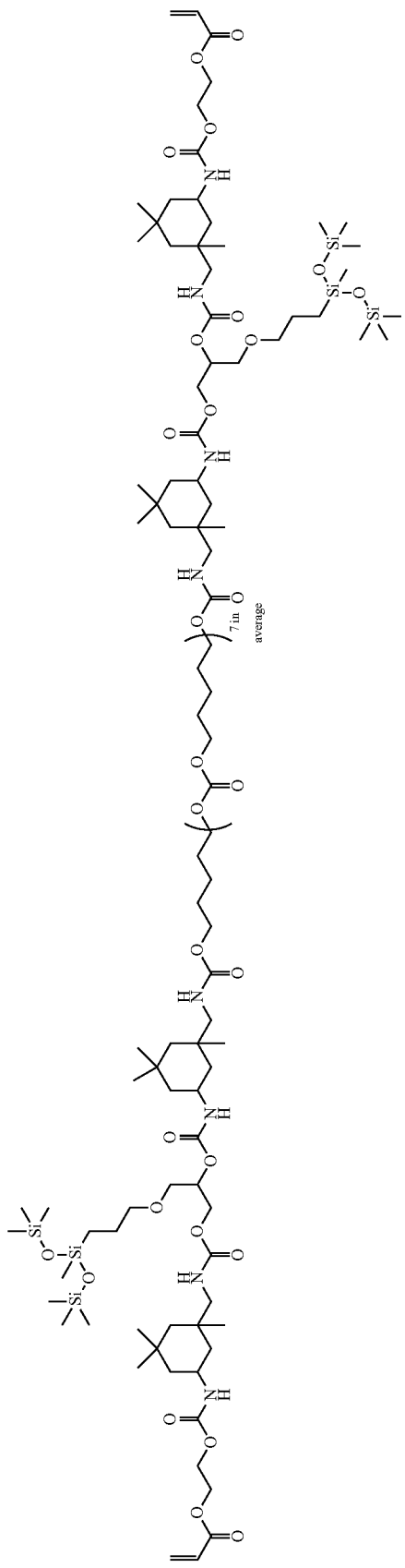
Silicone-pendant urethane-(meth) acrylate-6

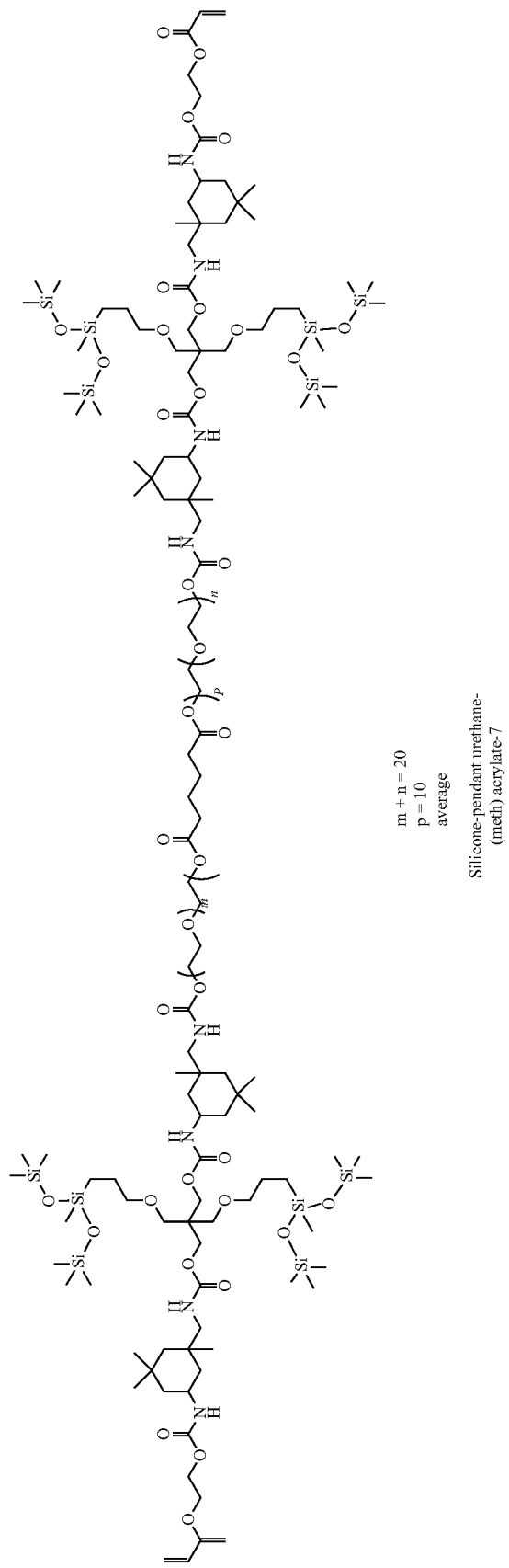
m + n = 20
p = 10
average
Silicone-pendant urethane-(meth) acrylate-7

-continued
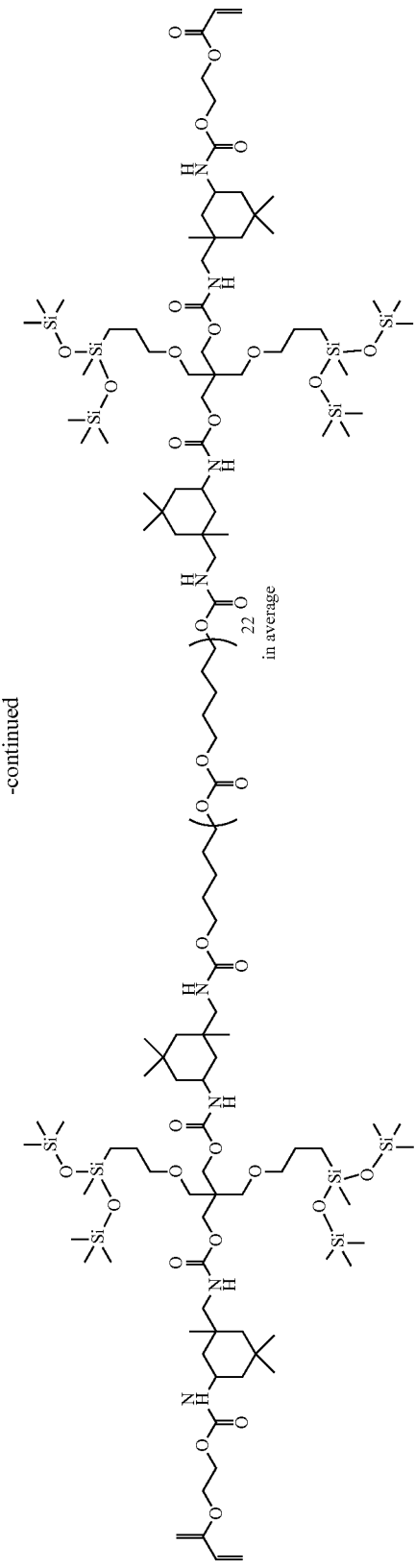
Silicone-pendant urethane-(meth) acrylate-8
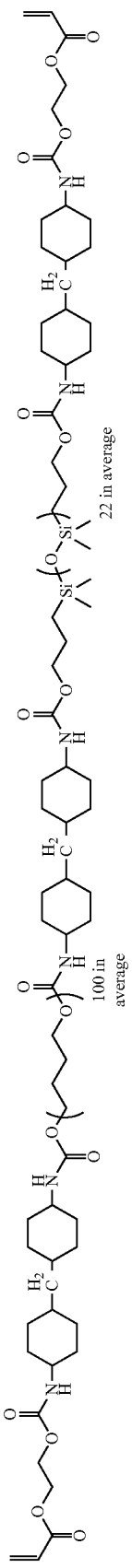
Silicone urethane- (meth) acrylate-1

-continued
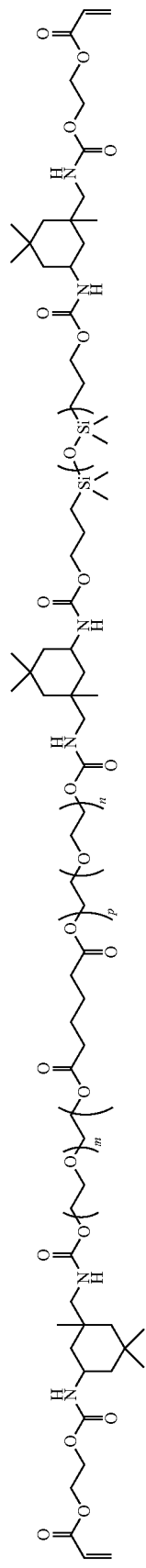
m + n = 20
p = 10
in average
Silicone urethane-(meth) acrylate-2
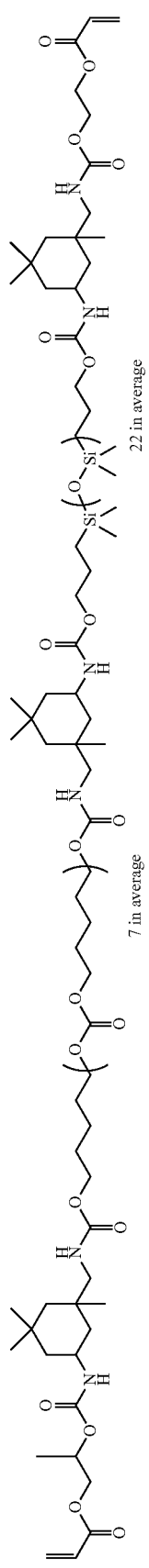
22 in average
7 in average
Silicone urethane-(meth) acrylate-3

In the formulae, the number of repeating units each represent the average value.

The following are Photo-radical generators-1 to 3 blended to compositions for forming a stretchable film as an additive.
Photo-radical generator-1: diphenyl(2,4,6-trimethylbenzoyl) phosphine oxide
Photo-radical generator-2: 2,2-dimethoxy-2-phenylacetophenone
Photo-radical generator-3: (±)-camphorquinone The following is an organic solvent blended to compositions for forming a stretchable film.
Organic solvent: propylene glycol monomethyl ether acetate (PGMEA)

The following is a monomer having an alkyl group or an aryl group blended to compositions for forming a stretchable film.
Monomer having an alkyl group or an aryl group: isobornyl acrylate, trimethylolpropane triacrylate, tricyclodecanedimethanol diacrylate Examples and Comparative Examples Each composition for forming a stretchable film (Stretchable film materials 1-1 to 1-9) was prepared by mixing Silicone pendant diol compound, Silicone diol compound, Silicone compound, Isocyanate compound, Hydroxy compound, and organic solvent in the composition described in Table 1, followed by defoaming. The ratios of molar numbers of hydroxy group and isocyanate group in the compositions for forming a stretchable film are also shown in Table 1.

TABLE 1

| Stretchable film material | Silicon diol compound (parts by mass) | Isocyanate compound (parts by mass) | Hydroxy compounds (parts by mass) | Organic solvent (parts by mass) | Molar ratio hydroxy/isocyanate |
|---|---|---|---|---|---|
| Stretchable film material 1-1 | Silicone pendant diol compound-1 (5) | Isocyanate compound-1 (5.5) | Hydroxy compound-1 (1) Hydroxy compound-2 (0.5) Hydroxy compound-4 (5) | — | 1.06 |
| Stretchable film material 1-2 | Silicone pendant diol compound-2 (5) | Isocyanate compound-2 (6.8) | Hydroxy compound-5 (1) Hydroxy compound-3 (0.2) Hydroxy compound-4 (5) | — | 1.04 |
| Stretchable film material 1-3 | Silicone pendant diol compound-3 (4) | Isocyanate compound-3 (4.3) | Hydroxy compound-2 (1) Hydroxy compound-3 (0.2) Hydroxy compound-4 (10) | — | 1.05 |
| Stretchable film material 1-4 | Silicone pendant diol compound-4 (5) | Isocyanate compound-3 (3.7) | Hydroxy compound-5 (1) Hydroxy compound-3 (0.2) Hydroxy compound-4 (20) | — | 1.04 |
| Stretchable film material 1-5 | Silicone pendant diol compound-1 (4) Silicone pendant diol compound-5 (1) | Isocyanate compound-3 (5.5) | Hydroxy compound-5 (2) Hydroxy compound-3 (0.2) Hydroxy compound-4 (15) | — | 1.03 |
| Stretchable film material 1-6 | Silicone diol compound-1 (4) | Isocyanate compound-1 (4) Isocyanate compound-4 (1) | Hydroxy compound-5 (2) Hydroxy compound-4 (15) | PGMEA (200) | 1.06 |
| Stretchable film material 1-7 | Silicone compound-1 (4) | Isocyanate compound-1 (4) Isocyanate compound-5 (1) | Hydroxy compound-5 (1.2) Hydroxy compound-4 (15) | PGMEA (200) | 1.06 |
| Stretchable film material 1-8 | Silicone diol compound-1 (4) | Isocyanate compound-1 (4) Isocyanate compound-4 (1) | Hydroxy compound-5 (1.2) Hydroxy compound-4 (15) | — | 1.06 |
| Stretchable film material 1-9 | Silicone compound-1 (4) | Isocyanate compound-1 (4) Isocyanate compound-5 (1) | Hydroxy compound-5 (1.2) Hydroxy compound-4 (15) | — | 1.06 |

Compositions for forming a stretchable film (Stretchable film materials 2-1 to 2-14) were prepared by mixing a silicone urethane compound having a (meth)acrylate group at the terminal, a monomer having an alkyl group or an aryl group, each of Photo-radical generators-1 to 3, and organic solvent in each composition described in Table 2.

TABLE 2

| Stretchable film material | Silicone urethane compound and Monomer (parts by mass) | Additive (parts by mass) | Organic solvent (parts by mass) |
|---|---|---|---|
| Stretchable film material 2-1 | Silicone-pendant urethane-(meth)acrylate-1 (70) Isobornyl acrylate (30) | Photo-radical generator-1 (1) | — |
| Stretchable film material 2-2 | Silicone-pendant urethane-(meth)acrylate-2 (70) Isobornyl acrylate (30) | Photo-radical generator-2 (2) | — |

TABLE 2-continued

| Stretchable film material | Silicone urethane compound and Monomer (parts by mass) | Additive (parts by mass) | Organic solvent (parts by mass) |
|---|---|---|---|
| Stretchable film material 2-3 | Silicone-pendant urethane-(meth)acrylate-3 (70)<br>Isobornyl acrylate (30) | Photo-radical generator-3 (3) | — |
| Stretchable film material 2-4 | Silicone-pendant urethane-(meth)acrylate-4 (70)<br>Isobornyl acrylate (30) | Photo-radical generator-3 (3) | — |
| Stretchable film material 2-5 | Silicone-pendant urethane-(meth)acrylate-1 (50)<br>Silicone-pendant urethane-(meth)acrylate-5 (30)<br>Isobornyl acrylate (20) | Photo-radical generator-3 (3) | — |
| Stretchable film material 2-6 | Silicone-pendant urethane-(meth)acrylate-1 (60)<br>Silicone-pendant urethane-(meth)acrylate-6 (20)<br>Isobornyl acrylate (20) | Photo-radical generator-1 (1) | — |
| Stretchable film material 2-7 | Silicone-pendant urethane-(meth)acrylate-1 (50)<br>Silicone-pendant urethane-(meth)acrylate-7 (30)<br>Isobornyl acrylate (20) | Photo-radical generator-3 (3) | — |
| Stretchable film material 2-8 | Silicone-pendant urethane-(meth)acrylate-1 (60)<br>Silicone-pendant urethane-(meth)acrylate-8 (20)<br>Isobornyl acrylate (20) | Photo-radical generator-1 (1) | — |
| Stretchable film material 2-9 | Silicone urethane-(meth)acrylate-1 (70)<br>Isobornyl acrylate (30)<br>Trimethylolpropane triacrylate (3) | Photo-radical generator-1 (1) | PGMEA (100) |
| Stretchable film material 2-10 | Silicone urethane-(meth)acrylate-1 (40)<br>Silicone urethane-(meth)acrylate-2 (40)<br>Isobornyl acrylate (20) | Photo-radical generator-3 (3) | PGMEA (100) |
| Stretchable film material 2-11 | Silicone urethane-(meth)acrylate-1 (50)<br>Silicone urethane-(meth)acrylate-3 (30)<br>Isobornyl acrylate (20)<br>Tricyclodecanedimethanol diacrylate (3) | Photo-radical generator-1 (1) | PGMEA (100) |
| Stretchable film material 2-12 | Silicone urethane-(meth)acrylate-1 (70)<br>Isobornyl acrylate (30) | Photo-radical generator-1 (1) | — |
| Stretchable film material 2-13 | Silicone urethane-(meth)acrylate-1 (40)<br>Silicone urethane-(meth)acrylate-2 (40)<br>Isobornyl acrylate (20) | Photo-radical generator-3 (3) | — |
| Stretchable film material 2-14 | Silicone urethane-(meth)acrylate-1 (50)<br>Silicone urethane-(meth)acrylate-3 (30)<br>Isobornyl acrylate (20) | Photo-radical generator-1 (1) | — |

(Preparation of Stretchable Film)

Each of Stretchable film materials 1-1 to 1-5 for the first layer was applied onto a polyethylene substrate by bar coating method, and baked at 130° C. for 20 minutes in a nitrogen atmosphere to form the first layer of a stretchable film on the substrate. In cases of Stretchable film materials 2-1 to 2-8, each was applied onto a polyethylene substrate by bar coating method, and irradiated with 500 mJ/cm² of light with a 1,000 W xenon lamp in a nitrogen atmosphere to cure the first layer of a stretchable film.

Onto the first layer, each Stretchable film material for the second layer was applied using a bar coater for coating a film thinner than the first layer. Each was cured by baking at 130° C. for 20 minutes in a nitrogen atmosphere in cases of Stretchable film materials 1-6 and 1-7 for the second layer; by baking at 110° C. for 10 minutes after the coating, followed by irradiation of 500 mJ/cm² of light with a 1,000 W xenon lamp in a nitrogen atmosphere in cases of Stretchable film materials 2-9 to 2-11 for the second layer; or by irradiation of 500 mJ/cm² of light with a 1,000 W xenon lamp in a nitrogen atmosphere in cases of Stretchable film materials 2-12 to 2-14 for the second layer to form a stretchable film.

As Comparative Examples, each of Stretchable film materials for the first layer and Stretchable film materials for the second layer was solely applied and cured. Stretchable film materials 1-8, 1-9, and 2-12 to 2-14 were compositions in which Stretchable film materials 1-6, 1-7, and 2-9 to 2-11 were not diluted with solvent respectively, and used for measuring the stretchability and strength of the single film. After the coating, each was cured under the same conditions for Stretchable film materials 1-6 and 1-7 in cases of Stretchable film materials 1-8 and 1-9, or under the same conditions for Stretchable film materials 2-9 to 2-11 in cases of Stretchable film materials 2-12 to 2-14.

(Measurement of Film Thickness, Contact Angle, Stretching Property, and Strength)

Each of the cured stretchable films (Examples 1 to 20), together with the first layers of the stretchable films and the second layers of the stretchable films of Comparative Examples (Comparative Examples 11 to 14 and Comparative Examples 1 to 10, respectively), was measured for film thickness and contact angle with water on the surface thereof, and were subjected to examination by touching to determine the tackiness. After measuring the contact angle with water on the surface of the stretchable film, the stretchable film was peeled from the substrate, and subjected to measurement of the stretching property and strength in conformity to JIS K 6251. The results are shown in Tables 3 and 4.

TABLE 3

| | Stretchable film material at the surface | Stretchable film material in the interior | Film thickness (μm) | Contact angle (°) | Elongation (%) | Strength (MPa) | Surface tackiness |
|---|---|---|---|---|---|---|---|
| Example 1 | Stretchable film material 1-6 | Stretchable film material 1-1 | 330 | 104 | 390 | 14.7 | none |
| Example 2 | Stretchable film material 1-6 | Stretchable film material 1-2 | 340 | 103 | 410 | 14.3 | none |

TABLE 3-continued

|  | Stretchable film material at the surface | Stretchable film material in the interior | Film thickness (μm) | Contact angle (°) | Elongation (%) | Strength (MPa) | Surface tackiness |
|---|---|---|---|---|---|---|---|
| Example 3 | Stretchable film material 1-6 | Stretchable film material 1-3 | 330 | 108 | 390 | 15.3 | none |
| Example 4 | Stretchable film material 1-6 | Stretchable film material 1-4 | 366 | 106 | 250 | 15.1 | none |
| Example 5 | Stretchable film material 1-7 | Stretchable film material 1-5 | 360 | 104 | 330 | 13.0 | none |
| Example 6 | Stretchable film material 2-9 | Stretchable film material 1-1 | 290 | 104 | 390 | 14.5 | none |
| Example 7 | Stretchable film material 2-10 | Stretchable film material 1-1 | 280 | 105 | 370 | 14.3 | none |
| Example 8 | Stretchable film material 2-11 | Stretchable film material 1-1 | 410 | 104 | 410 | 14.8 | none |
| Example 9 | Stretchable film material 2-9 | Stretchable film material 2-1 | 360 | 104 | 330 | 14.0 | none |
| Example 10 | Stretchable film material 2-10 | Stretchable film material 2-2 | 355 | 103 | 350 | 14.2 | none |
| Example 11 | Stretchable film material 2-11 | Stretchable film material 2-3 | 390 | 104 | 390 | 13.1 | none |
| Example 12 | Stretchable film material 2-9 | Stretchable film material 2-4 | 310 | 105 | 380 | 13.3 | none |
| Example 13 | Stretchable film material 2-9 | Stretchable film material 2-5 | 400 | 104 | 370 | 14.8 | none |
| Example 14 | Stretchable film material 2-9 | Stretchable film material 2-6 | 360 | 103 | 350 | 14.7 | none |
| Example 15 | Stretchable film material 2-9 | Stretchable film material 2-7 | 360 | 102 | 320 | 16.4 | none |
| Example 16 | Stretchable film material 2-9 | Stretchable film material 2-8 | 290 | 105 | 310 | 17.2 | none |
| Example 17 | Stretchable film material 1-6 | Stretchable film material 2-2 | 330 | 104 | 390 | 15.7 | none |
| Example 18 | Stretchable film material 2-12 | Stretchable film material 2-1 | 380 | 104 | 300 | 14.8 | none |
| Example 19 | Stretchable film material 2-13 | Stretchable film material 2-1 | 370 | 103 | 290 | 15.2 | none |
| Example 20 | Stretchable film material 2-14 | Stretchable film material 2-1 | 420 | 104 | 260 | 16.1 | none |

TABLE 4

|  | Material of the first layer | Material of the second layer | Film thickness (μm) | Contact angle (°) | Elongation (%) | Strength (MPa) | Surface tackiness |
|---|---|---|---|---|---|---|---|
| Comparative Example 1 | — | Stretchable film material 1-6 | 5 | — | — | — | none |
| Comparative Example 2 | — | Stretchable film material 1-7 | 6 | — | — | — | none |
| Comparative Example 3 | — | Stretchable film material 1-8 | 300 | 103 | 350 | 5.3 | none |
| Comparative Example 4 | — | Stretchable film material 1-9 | 330 | 101 | 410 | 6.1 | none |
| Comparative Example 5 | — | Stretchable film material 2-9 | 2 | — | — | — | none |
| Comparative Example 6 | — | Stretchable film material 2-10 | 2 | — | — | — | none |
| Comparative Example 7 | — | Stretchable film material 2-11 | 3 | — | — | — | none |
| Comparative Example 8 | — | Stretchable film material 2-12 | 300 | 103 | 390 | 7.3 | none |
| Comparative Example 9 | — | Stretchable film material 2-13 | 360 | 106 | 310 | 9.1 | none |
| Comparative Example 10 | — | Stretchable film material 2-14 | 380 | 103 | 280 | 10.1 | none |
| Comparative Example 11 | Stretchable film material 1-1 | — | 310 | 94 | 410 | 15.4 | exist |
| Comparative Example 12 | Stretchable film material 1-2 | — | 390 | 95 | 400 | 16.2 | exist |
| Comparative Example 13 | Stretchable film material 2-1 | — | 360 | 95 | 380 | 14.4 | exist |
| Comparative Example 14 | Stretchable film material 2-2 | — | 390 | 95 | 390 | 14.2 | exist |

As shown in Tables 3 and 4, the inventive stretchable films showed higher water repellency, strength, and stretchability, together with lower surface tackiness.

On the other hand, in the films each having only one layer as in Comparative Examples 1 to 14, the single stretchable film of the first layer (Comparative Examples 11 to 14) showed high water repellency, strength, and stretchability, but had a property in which films were stuck with each other due to the surface tackiness; the single stretchable film of the second layer (Comparative Examples 1 to 10) was free from surface tackiness, but showed inferior strength.

From the above, it was revealed that the inventive stretchable film has excellent stretching property and strength, together with excellent water repellency and low tackiness on the film surface, and has excellent properties as a film that is capable of printing stretchable wiring used for a wearable device and so on thereby.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A stretchable film comprising:

a silicone main-chain type urethane layer and a silicone-pendant type urethane layer, wherein the silicone main-chain type urethane layer has a structure shown by the following general formula (1)-1 and/or (1)-2 and is formed on the silicone-pendant type urethane layer, and the silicone-pendant type urethane layer has a structure shown by the following general formula (2)-1 and/or (2)-2:

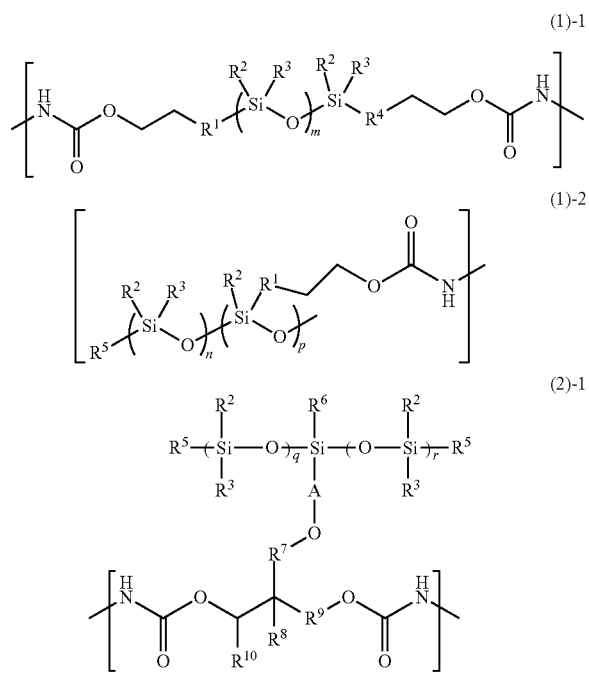

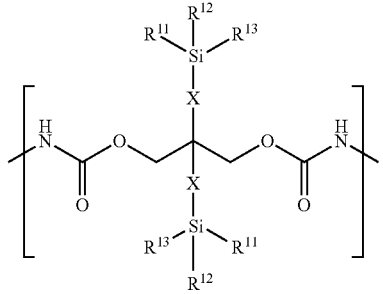

wherein $R^1$ and $R^4$ each represent a linear or branched alkylene group having 1 to 40 carbon atoms optionally containing an ether group or a thiol group; $R^2$, $R^3$, and $R^5$ represent the same or different linear, branched, or cyclic alkyl group having 1 to 6 carbon atoms, a phenyl group, or a 3,3,3-trifluoropropyl group; $R^6$, $R^{11}$, $R^{12}$, and $R^{13}$ represent the same or different linear, branched, or cyclic alkyl group having 1 to 6 carbon atoms, a phenyl group, a 3,3,3-trifluoropropyl group, or a —$(OSiR^2R^3)_s$—$OSiR^2R^3R^5$ group; $R^7$ and $R^9$ each represent a single bond, a methylene group, or an ethylene group, provided that the total number of the carbon atoms of $R^7$ and $R^9$ is 1 or 2; $R^8$ represents a hydrogen atom or a linear alkyl group having 1 to 4 carbon atoms; $R^{10}$ represents a hydrogen atom or a methyl group; "A" represents a linear or branched alkylene group having 3 to 7 carbon atoms; X represents a linear or branched alkylene group having 3 to 7 carbon atoms optionally containing an ether group; "m" and "n" are each an integer in the range of 1 to 100; "p" is an integer in the range of 2 to 10; and "q", "r", and "s" are each an integer in the range of 0 to 20.

2. The stretchable film according to claim 1, wherein the silicone main-chain type urethane layer has a structure containing a (meth)acrylate group at a terminal thereof shown by the following general formula (3)-1 and/or (3)-2:

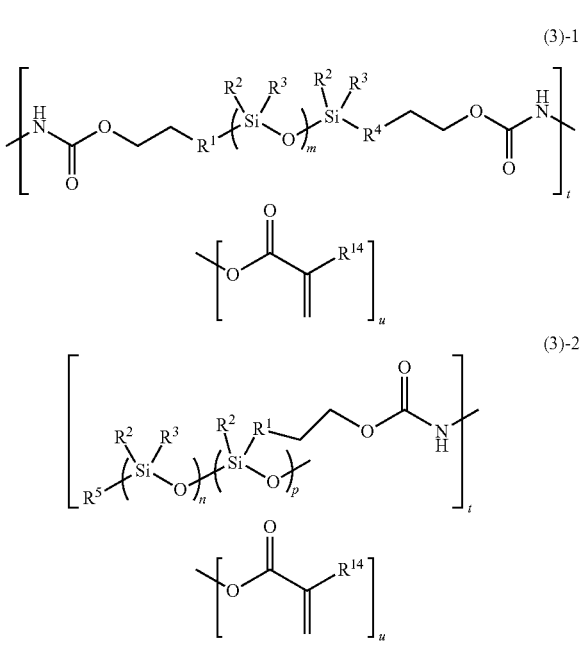

wherein $R^1$ to $R^5$, "m", "n", and "p" are the same as described above; $R^{14}$ represents a hydrogen atom or a methyl group; "t" and "u" each represent a number of unit in one molecule, and are integers in the range of $1 \leq t \leq 100$ and $1 \leq u \leq 3$.

3. The stretchable film according to claim 1, wherein the silicone-pendant type urethane layer has a structure containing a (meth)acrylate group at a terminal thereof shown by the following general formula (4)-1 and/or (4)-2:

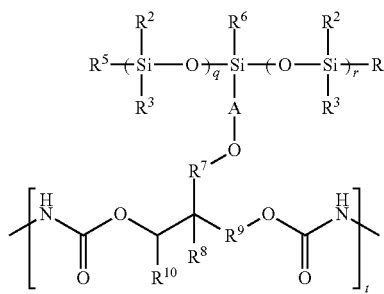
(4)-1

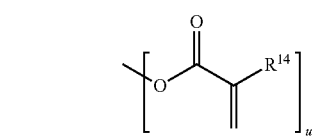

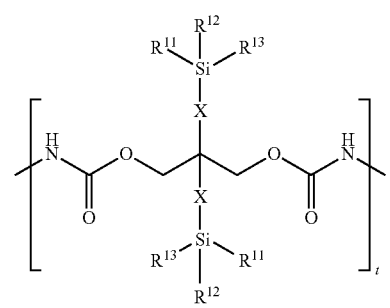
(4)-2

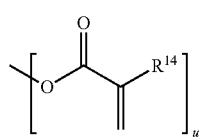

wherein $R^2$, $R^3$, $R^5$ to $R^{13}$, "A", X, "q", and "r" are the same as described above; $R^{14}$ represents a hydrogen atom or a methyl group; "t" and "u" each represent a number of unit in one molecule, and are integers in the range of 1 t 100 and $1 \leq u \leq 3$.

4. The stretchable film according to claim 2, wherein the silicone-pendant type urethane layer has a structure containing a (meth)acrylate group at a terminal thereof shown by the following general formula (4)-1 and/or (4)-2:

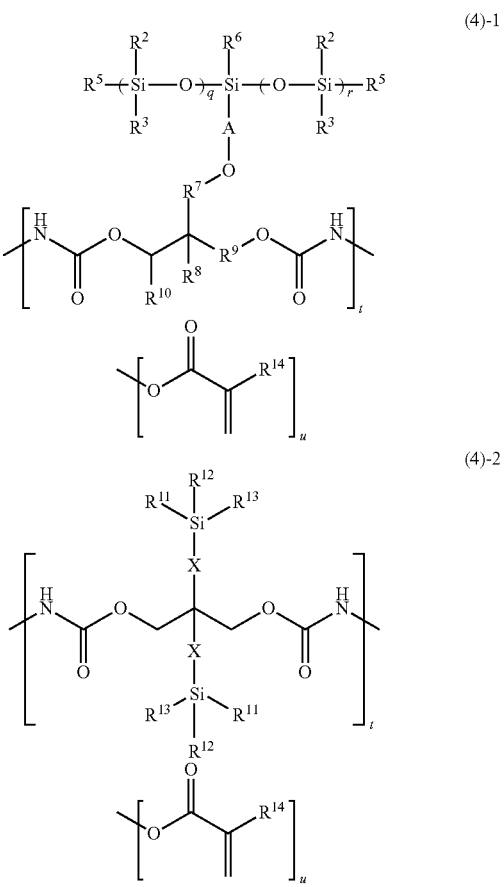

wherein $R^2$, $R^3$, $R^5$ to $R^{13}$, "A", X, "q", and "r" are the same as described above; $R^{14}$ represents a hydrogen atom or a methyl group; "t" and "u" each represent a number of unit in one molecule, and are integers in the range of 1 t 100 and $1 \leq u \leq 3$.

5. The stretchable film according to claim 1, wherein the stretchable film has a stretching property of 20 to 800% in a tensile test regulated by JIS K 6251.

6. The stretchable film according to claim 2, wherein the stretchable film has a stretching property of 20 to 800% in a tensile test regulated by JIS K 6251.

7. The stretchable film according to claim 3, wherein the stretchable film has a stretching property of 20 to 800% in a tensile test regulated by JIS K 6251.

8. The stretchable film according to claim 4, wherein the stretchable film has a stretching property of 20 to 800% in a tensile test regulated by JIS K 6251.

9. The stretchable film according to claim 1, wherein the stretchable film is used as a film to be in contact with a conductive wiring having stretchability.

10. The stretchable film according to claim 2, wherein the stretchable film is used as a film to be in contact with a conductive wiring having stretchability.

11. The stretchable film according to claim 3, wherein the stretchable film is used as a film to be in contact with a conductive wiring having stretchability.

12. A method for forming a stretchable film comprising:
  forming a silicone-pendant type urethane layer having a structure shown by the following general formula (2)-1 and/or (2)-2 through curing by heating and/or light exposure; and forming a silicone main-chain type urethane layer having a structure shown by the following general formula (1)-1 and/or (1)-2 on a surface of the silicone-pendant type urethane layer through curing by heating and/or light exposure:

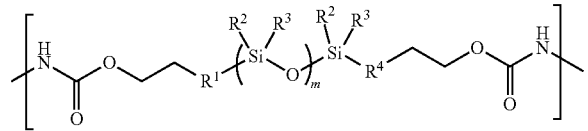
(1)-1

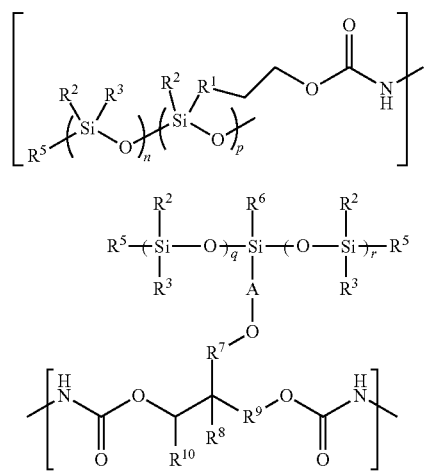
(1)-2

(2)-1

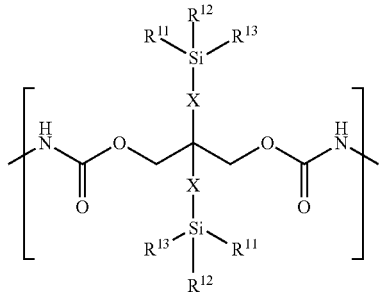
(2)-2 wherein $R^1$ and $R^4$ each represent a linear or branched alkylene group having 1 to 40 carbon atoms optionally containing an ether group or a thiol group; $R^2$, $R^3$, and $R^5$ represent the same or different linear, branched, or cyclic alkyl group having 1 to 6 carbon atoms, a phenyl group, or a 3,3,3-trifluoropropyl group; $R^6$, $R^{11}$, $R^{12}$, and $R^{13}$ represent the same or different linear, branched, or cyclic alkyl group having 1 to 6 carbon atoms, a phenyl group, a 3,3,3-trifluoropropyl group, or a $-(OSiR^2R^3)_s-OSiR^2R^3R^5$ group; $R^7$ and $R^9$ each represent a single bond, a methylene group, or an ethylene group, provided that the total number of the carbon atoms of $R^7$ and $R^9$ is 1 or 2; $R^8$ represents a hydrogen atom or a linear alkyl group having 1 to 4 carbon atoms; $R^{10}$ represents a hydrogen atom or a methyl group; "A" represents a linear or branched alkylene group having 3 to 7 carbon atoms; X represents a linear or branched alkylene group having 3 to 7 carbon atoms optionally containing an ether group; "m" and "n" are each an integer in the range of 1 to 100; "p" is an integer in the range of 2 to 10; and "q", "r", and "s" are each an integer in the range of 0 to 20.

* * * * *